United States Patent
Canpolat et al.

(10) Patent No.: US 10,313,449 B2
(45) Date of Patent: *Jun. 4, 2019

(54) ONLINE SIGNUP PROVISIONING TECHNIQUES FOR HOTSPOT CONNECTIONS

(71) Applicant: Intel IP Corporation, Santa Clara, CA (US)

(72) Inventors: Necati Canpolat, Beaverton, OR (US); Venkata Vallabhu, Portland, OR (US); Vivek G. Gupta, San Jose, CA (US)

(73) Assignee: Intel IP Corporation, Santa Clara, CA (US)

( * ) Notice: Subject to any disclaimer, the term of this patent is extended or adjusted under 35 U.S.C. 154(b) by 9 days.

This patent is subject to a terminal disclaimer.

(21) Appl. No.: 15/198,090

(22) Filed: Jun. 30, 2016

(65) Prior Publication Data

US 2016/0308976 A1     Oct. 20, 2016

Related U.S. Application Data

(63) Continuation of application No. 14/124,767, filed as application No. PCT/US2013/052743 on Jul. 30, 2013, now Pat. No. 9,479,595.

(Continued)

(51) Int. Cl.
*H04L 5/00* (2006.01)
*H04L 29/08* (2006.01)
(Continued)

(52) U.S. Cl.
CPC .......... *H04L 67/141* (2013.01); *H04L 5/0092* (2013.01); *H04L 67/02* (2013.01);
(Continued)

(58) Field of Classification Search
CPC ..... H04L 67/141; H04L 5/0092; H04L 67/02; H04L 41/0293; H04W 72/042; H04W 72/06; H04W 48/16; H04W 76/021
See application file for complete search history.

(56) References Cited

U.S. PATENT DOCUMENTS 7,551,577 B2     6/2009 Mcrae
7,944,901 B2     5/2011 Souissi et al.
(Continued)

FOREIGN PATENT DOCUMENTS

CN     101243717 A     8/2008
CN     101262670 A     9/2008
(Continued)

OTHER PUBLICATIONS

"U.S. Appl. No. 14/731,668, Advisory Action dated Aug. 4, 2017", 3 pgs.
(Continued)

*Primary Examiner* — Timothy J Weidner
*Assistant Examiner* — Debebe A Asefa
(74) *Attorney, Agent, or Firm* — Schwegman Lundberg & Woessner, P.A.

(57) ABSTRACT

Embodiments of system and method configurations for providing provisioning information to a mobile device via a wireless network access point are generally described herein. In some examples, a communication session is established between a mobile device and a service provider to obtain provisioning information for wireless network connectivity via a designated access point (e.g., a "hotspot"). A HTTP session is established within the communication session to exchange registration information via a browser of the mobile device. Provisioning information is returned within the communication session in a Subscription Management Object (MO) in response to successful completion (Continued)

of the HTTP session. The subscription MO is provided outside of the browser and the HTTP session (but within the communication session) using mechanisms such as OMA-DM or SOAP-XML communications. The mobile device can then utilize the provisioning information from the subscription MO to associate with an appropriate hotspot.

21 Claims, 9 Drawing Sheets

Related U.S. Application Data

(60) Provisional application No. 61/761,167, filed on Feb. 5, 2013.

(51) Int. Cl.
 *H04W 72/04* (2009.01)
 *H04W 12/06* (2009.01)
 *H04W 12/08* (2009.01)
 *H04W 12/04* (2009.01)
 *H04W 4/80* (2018.01)

(52) U.S. Cl.
 CPC .............. *H04W 4/80* (2018.02); *H04W 12/04* (2013.01); *H04W 12/06* (2013.01); *H04W 12/08* (2013.01); *H04W 72/042* (2013.01)

(56) References Cited

U.S. PATENT DOCUMENTS

| | | | |
|---|---|---|---|
| 8,340,057 B2 | 12/2012 | Abujbara | |
| 8,352,643 B2 | 1/2013 | Birnbaum | |
| 8,400,990 B1 | 3/2013 | Volpano et al. | |
| 8,588,413 B1 | 11/2013 | Kalbag et al. | |
| 8,590,023 B2 | 11/2013 | Gupta et al. | |
| 8,750,180 B2 | 6/2014 | Mccann et al. | |
| 8,913,559 B2 * | 12/2014 | Chen et al. | 370/328 |
| 9,084,081 B2 | 7/2015 | Gupta et al. | |
| 9,307,408 B2 | 4/2016 | Gupta et al. | |
| 9,479,595 B2 | 10/2016 | Canpolat et al. | |
| 9,571,482 B2 | 2/2017 | Gupta et al. | |
| 9,906,940 B2 | 2/2018 | Gupta et al. | |
| 2003/0028805 A1 | 2/2003 | Lahteenmaki | |
| 2004/0210468 A1 | 10/2004 | Rubel et al. | |
| 2004/0235455 A1 | 11/2004 | Jiang | |
| 2005/0260996 A1 | 11/2005 | Groenendaal et al. | |
| 2006/0072527 A1 | 4/2006 | Beck et al. | |
| 2006/0105713 A1 | 5/2006 | Zheng et al. | |
| 2006/0173976 A1 | 8/2006 | Vincent et al. | |
| 2006/0221917 A1 | 10/2006 | Mcrae | |
| 2006/0236105 A1 | 10/2006 | Brok et al. | |
| 2006/0280128 A1 | 12/2006 | Abdel | |
| 2006/0286977 A1 | 12/2006 | Khandelwal et al. | |
| 2007/0066306 A1 | 3/2007 | Cheng | |
| 2007/0223432 A1 | 9/2007 | Badarinath | |
| 2007/0294385 A1 | 12/2007 | Kapadekar et al. | |
| 2008/0140814 A1 | 6/2008 | Cohen | |
| 2008/0181187 A1 | 7/2008 | Scott et al. | |
| 2008/0220741 A1 | 9/2008 | Hung | |
| 2008/0225805 A1 | 9/2008 | Pearson et al. | |
| 2009/0028082 A1 | 1/2009 | Wynn et al. | |
| 2009/0199281 A1 | 8/2009 | Cai et al. | |
| 2009/0260070 A1 | 10/2009 | Soliman | |
| 2010/0031029 A1 | 2/2010 | Ilyadis | |
| 2010/0124881 A1 | 5/2010 | Uppunda et al. | |
| 2010/0195562 A1 | 8/2010 | Ishizu et al. | |
| 2010/0211993 A1 | 8/2010 | Islam et al. | |
| 2010/0226274 A1 | 9/2010 | Burbidge et al. | |
| 2010/0290424 A1 | 11/2010 | Collingrige | |
| 2010/0325425 A1 | 12/2010 | Park et al. | |
| 2011/0007705 A1 | 1/2011 | Buddhikot et al. | |
| 2011/0055411 A1 | 3/2011 | Taaghol | |
| 2011/0130117 A1 | 6/2011 | Fan et al. | |
| 2011/0149874 A1 | 6/2011 | Reif et al. | |
| 2011/0154454 A1 | 6/2011 | Frelechoux et al. | |
| 2011/0268027 A1 | 11/2011 | Nogawa | |
| 2011/0269449 A1 | 11/2011 | Kazmi et al. | |
| 2011/0300865 A1 | 12/2011 | Kashikar et al. | |
| 2012/0047245 A1 | 2/2012 | Zhou et al. | |
| 2012/0071139 A1 | 3/2012 | Kumar et al. | |
| 2012/0149334 A1 | 6/2012 | Zhang et al. | |
| 2012/0203824 A1 | 8/2012 | Oommen | |
| 2012/0258709 A1 | 10/2012 | Swaminathan et al. | |
| 2012/0284785 A1 | 11/2012 | Salkintzis et al. | |
| 2013/0007853 A1 | 1/2013 | Gupta et al. | |
| 2013/0024921 A1 | 1/2013 | Gupta et al. | |
| 2013/0078985 A1 | 3/2013 | Savolainen et al. | |
| 2013/0232561 A1 * | 9/2013 | Gupta | H04W 8/18 726/5 |
| 2014/0029512 A1 * | 1/2014 | Chu et al. | 370/328 |
| 2014/0080450 A1 | 3/2014 | Gupta et al. | |
| 2014/0185597 A1 | 7/2014 | Gupta et al. | |
| 2015/0180978 A1 | 6/2015 | Canpolat et al. | |
| 2015/0350871 A1 | 12/2015 | Gupta et al. | |
| 2017/0099184 A1 | 4/2017 | Oommen et al. | |
| 2017/0290088 A1 | 10/2017 | Gupta et al. | |
| 2018/0242137 A1 | 8/2018 | Gupta et al. | |

FOREIGN PATENT DOCUMENTS

| | | |
|---|---|---|
| CN | 101578900 A | 11/2009 |
| CN | 102857997 A | 1/2013 |
| CN | 103688565 A | 3/2014 |
| CN | 104982072 A | 10/2015 |
| CN | 105376219 A | 3/2016 |
| CN | 105635165 A | 6/2016 |
| CN | 102857997 B | 8/2016 |
| CN | 106028333 A | 10/2016 |
| CN | 103688565 B | 2/2018 |
| CN | 108063689 A | 5/2018 |
| EP | 2673988 A1 | 12/2013 |
| EP | 2727415 A2 | 5/2014 |
| EP | 2735183 B1 | 9/2016 |
| JP | 2005005790 A | 1/2005 |
| JP | 2006505201 A | 2/2006 |
| JP | 2006523412 A | 10/2006 |
| JP | 2009005011 A | 1/2009 |
| JP | 2009512257 A | 3/2009 |
| JP | 2009141664 A | 6/2009 |
| JP | 2010062914 A | 3/2010 |
| JP | 2011501626 A | 1/2011 |
| JP | 2014526726 A | 10/2014 |
| JP | 2016034166 A | 3/2016 |
| JP | 5918337 B2 | 5/2016 |
| JP | 6142420 B2 | 6/2017 |
| KR | 101547541 B1 | 8/2015 |
| KR | 101589423 B1 | 1/2016 |
| KR | 101662607 B1 | 10/2016 |
| WO | WO-2004084465 A2 | 9/2004 |
| WO | WO-2007024400 A2 | 3/2007 |
| WO | WO-2010050755 A2 | 5/2010 |
| WO | WO-2010098035 A1 | 9/2010 |
| WO | WO-2010124162 A2 | 10/2010 |
| WO | WO-2010141437 A2 | 12/2010 |
| WO | WO-2011016947 A2 | 2/2011 |
| WO | WO-2012036992 A2 | 3/2012 |
| WO | WO-2012107639 A1 | 8/2012 |
| WO | WO-2012110694 A1 | 8/2012 |
| WO | WO-2013002956 A2 | 1/2013 |
| WO | WO-2013002956 A3 | 1/2013 |
| WO | WO-2013013040 A2 | 1/2013 |
| WO | WO-2013013040 A3 | 1/2013 |
| WO | WO-2013066348 A1 | 5/2013 |
| WO | WO-2014105114 A1 | 7/2014 |
| WO | WO-2014123576 A1 | 8/2014 |

OTHER PUBLICATIONS

"U.S. Appl. No. 14/731,668, Response filed Jul. 26, 2017 to Final Office Action dated Apr. 26, 2017", 8 pgs.

(56) References Cited

OTHER PUBLICATIONS

"U.S. Appl. No. 15/431,149, Preliminary Amendment filed Jun. 22, 2017", 11 pgs.
"Chinese Application Serial No. 201280036196.9, Office Action dated Jun. 19, 2017", w/English Translation, 7 pgs.
"European Application Serial No. 12804461.7, Response filed Jul. 6, 2017 to Communication Pursuant to Article 94(3) EPC dated Feb. 27, 2017", 14 pgs.
"European Application Serial No. 13874312.5, Response filed May 31, 2017 to Extended European Search Report dated Aug. 16, 2016", w/ English Translation, 15 pgs.
"U.S. Appl. No. 13/188,205, Notice of Allowance dated Oct. 3, 2016", 19 pgs.
"U.S. Appl. No. 14/731,668, Advisory Action dated Nov. 4, 2016", 2 pgs.
"U.S. Appl. No. 14/731,668, Final Office Action dated Apr. 26, 2017", 18 pgs.
"U.S. Appl. No. 14/731,668, Non Final Office Action dated Jan. 11, 2017", 18 pgs.
"U.S. Appl. No. 14/731,668, Response filed Apr. 11, 2017 to Non Final Office Action dated Jan. 11, 2017", 8 pgs.
"U.S. Appl. No. 14/731,668, Response filed Oct. 19, 2016 to Final Office Action dated Jul. 19, 2016", 8 pgs.
"U.S. Appl. No. 14/731,668, Response filed Nov. 18, 2016 to Final Office Action dated Jul. 19, 2016", 8 pgs.
"Chinese Application Serial No. 2012800361969, Office Action dated Feb. 13, 2017", w/ English Translation, 7pgs.
"Chinese Application Serial No. 2012800361969, Response filed Apr. 27, 2017 to Office Action dated Feb. 13, 2017", w/ claims in English, 48 pgs.
"Chinese Application Serial No. 201280036196.9, Response filed Dec. 5, 2016 to Office Action dated Jul. 21, 2016", w/ Claims in English, 26 pgs.
"European Application Serial No. 12804461.7, Communication Pursuant to Article 94(3) EPC dated Feb. 27, 2017", 6 pgs.
"European Application Serial No. 12804461.7, Response filed Dec. 7, 2016 to Communication Pursuant to Article 94(3) EPC dated Aug. 10, 2016", 11 pgs.
"European Application Serial No. 16181514.7, Extended European Search Report dated Nov. 29, 2016", 9 pgs.
"Japanese Application Serial No. 2015-242537, Office Action dated Sep. 27, 2016", w/ English Translation, 6 pgs.
"Japanese Application Serial No. 2015-242537, Response filed Dec. 27, 2016 to Office Action dated Sep. 27, 2016", w/ Claims in English, 17 pgs.
"Korean Application Serial No. 2015-7033200, Response filed Apr. 18, 2016 to Office Action dated Feb. 18, 2016", w/ English Claims, 16 pgs.
U.S. Appl. No. 13/173,338, U.S. Pat. No. 8,590,023, filed Jun. 30, 2011, Mobile Device and Method for Automatic Connectivity, Data Offloading and Roaming Between Networks.
U.S. Appl. No. 14/083,028, U.S. Pat. No. 9,084,081, filed Nov. 18, 2013, Mobile Device and Method for Automatic Connectivity, Data Offloading and Roaming Between Networks.
U.S. Appl. No. 14/731,668, filed Jun. 5, 2015, Mobile Device and Method for Automatic Connectivity, Data Offloading and Roaming Between Networks.
U.S. Appl. No. 13/188,205, filed Jul. 21, 2011, Secure On-Line Sign-Up and Provisioning for Wi-Fi Hotspots Using a Device-Management Protocol.
U.S. Appl. No. 14/124,767, filed Dec. 9, 2013, Online Signup Provisioning Techniques for Hotspot Connections.
"U.S. Appl. No. 14/731,668, Notice of Allowance dated Oct. 11, 2017", 13 pgs.
"Chinese Application Serial No. 201280036196.9, Response filed Sep. 4, 2017 to Office Action dated Jun. 19, 2017", w/ claims in English, 45 pgs.
"Chinese Application Serial No. 201510702797.4, Office Action dated Dec. 15, 2017", Without English Translation, 11 pgs.
"European Application Serial No. 15192254.9, Communication Pursuant to Article 94(3) EPC dated Dec. 7, 2017", 4 pgs.
"U.S. Appl. No. 14/731,668, Notice of Allowability dated Jan. 17, 2018", 2 pgs.
"U.S. Appl. No. 15/431,149, Examiner Interview Summary dated May 10, 2018", 3 pgs.
"U.S. Appl. No. 15/431,149, Examiner Interview Summary dated Sep. 27, 2018", 2 pgs.
"U.S. Appl. No. 15/431,149, Final Office Action dated Jun. 13, 2018", 19 pgs.
"U.S. Appl. No. 15/431,149, Non Final Office Action dated Feb. 9, 2018", 19 pgs.
"U.S. Appl. No. 15/431,149, Response Filed May 9, 2018 to Non Final Office Action dated Feb. 9, 2018", 10 pgs.
"U.S. Appl. No. 15/431,149, Response filed Oct. 15, 2018 to Final Office Action dated Jun. 13, 2008", 10 pgs.
"U.S. Appl. No. 15/873,537, Final Office Action dated Nov. 2, 2018", 11 pgs.
"U.S. Appl. No. 15/873,537, Non Final Office Action dated Jun. 28, 2018", 16 pgs.
"U.S. Appl. No. 15/873,537, Preliminary Amendment filed May 16, 2018", 7 pgs.
"Architecture enhancements for non-3GPP accesses", 3GPP TS 23.402 V10.3.0. Technical Specification Group Services and System Aspects. Release 10., (Mar. 2011), 227 pgs.
"Chinese Application Serial No. 201380069265.0, Office Action dated Jan. 3, 2018", w/ English Translation, 10 pgs.
"Chinese Application Serial No. 201380069265.0, Office Action dated Sep. 30, 2018", W/ English Translation, 12 pgs.
"Chinese Application Serial No. 201380069265.0, Response filed May 18, 2018 to Office Action dated Jan. 3, 2018", w/ English Claims, 23 pgs.
"Chinese Application Serial No. 201510702797.4, Office Action dated Oct. 12, 2018", W/ English Translation, 22 pgs.
"Chinese Application Serial No. 201510702797.4, Response filed Jul. 2, 2018 to Office Action Dec. 15, 2017", w/ English claims, 15 pgs.
"Chinese Application Serial No. 201810039879.9, Voluntary Amendment filed Sep. 14, 2018", w/ claims, 11 pgs.
"European Application Serial No. 15192254.9, Response filed Jun. 7, 2018 to Communication Pursuant to Article 94(3) EPC dated Dec. 7, 2017", 13 pgs.
"Radio Resource Control (RRC); Protocol specification (Release 10)", 3GPP TS 36.331 v10.2.0, (Jun. 2011), 294 pgs.
"A new program from the Wi-Fi Alliance to enable seamless Wi-Fi access in hotspots", Wi-Fi Certified Passpoint, (Jun. 2012), 11 pgs.
"U.S. Appl. No. 13/173,338 , Response filed Apr. 29, 2013 to Non Final Office Action dated Nov. 29, 2012", 12 pgs.
"U.S. Appl. No. 13/173,338, Non Final Office Action dated Nov. 29, 2012", 18 pgs.
"U.S. Appl. No. 13/173,338, Notice of Allowance dated Jul. 9, 2013", 6 pgs.
"U.S. Appl. No. 13/188,205, Advisory Action dated Mar. 18, 2016", 5 pgs.
"U.S. Appl. No. 13/188,205, Examiner Interview Summary dated Mar. 10, 2016", 3 pgs.
"U.S. Appl. No. 13/188,205, Examiner Interview Summary dated Sep. 21, 2015", 3 pgs.
"U.S. Appl. No. 13/188,205, Examiner Interview Summary dated Nov. 18, 2013", 3 pgs.
"U.S. Appl. No. 13/188,205, Final Office Action dated Aug. 9, 2013", 23 pgs.
"U.S. Appl. No. 13/188,205, Final Office Action dated Oct. 13, 2015", 25 pgs.
"U.S. Appl. No. 13/188,205, Non Final Office Action dated Mar. 17, 2015", 22 pgs.
"U.S. Appl. No. 13/188,205, Non Final Office Action dated Mar. 20, 2013", 22 pgs.
"U.S. Appl. No. 13/188,205, Response filed Mar. 23, 2016 to Final Office Action dated Oct. 13, 2015", 13 pgs.
"U.S. Appl. No. 13/188,205, Response filed Jun. 17, 2015 to Non Final Office Action dated Mar. 17, 2015" 8 pgs.

(56) References Cited

OTHER PUBLICATIONS

"U.S. Appl. No. 13/188,205, Response filed Jul. 19, 2013 to Non Final Office Action dated Mar. 20, 2013", 16 pgs.
"U.S. Appl. No. 13/188,205, Response filed Dec. 9, 2013 to Final Office Action dated Aug. 9, 2013", 13 pgs.
"U.S. Appl. No. 13/512,105, Final Office Action dated Jan. 22, 2014", 12 pgs.
"U.S. Appl. No. 13/512,105, Non Final Office Action dated Aug. 15, 2013", 10 pgs.
"U.S. Appl. No. 13/512,105, Preliminary Amendment filed May 25, 2012", 3 pgs.
"U.S. Appl. No. 13/512,105, Response filed Dec. 16, 2013 to Non Final Office Action dated Aug. 15, 2013", 10 pgs.
"U.S. Appl. No. 13/728,606, Notice of Allowance dated Nov. 25, 2015", 7 pgs.
"U.S. Appl. No. 13/728,606, Response filed Oct. 2, 2015 to Non Final Office Action dated Jul. 2, 2015", 7 pgs.
"U.S. Appl. No. 14/083,028, Advisory Action dated Oct. 28, 2014", 3 pgs.
"U.S. Appl. No. 14/083,028, Final Office Action dated Aug. 18, 2014", 17 pgs.
"U.S. Appl. No. 14/083,028, Non Final Office Action dated Apr. 30, 2014", 15 pgs.
"U.S. Appl. No. 14/083,028, Notice of Allowance dated Mar. 10, 2015", 7 pgs.
"U.S. Appl. No. 14/083,028, Response filed Oct. 20, 2014 to Final Office Action dated Aug. 18, 2014", 12 pgs.
"U.S. Appl. No. 14/083,028, Response filed Jul. 30, 2014 to Non-Final Office Action dated Apr. 30, 2014", 12 pgs.
"U.S. Appl. No. 14/124,767, Advisory Action dated Feb. 24, 2016", 3 pgs.
"U.S. Appl. No. 14/124,767, Final Office Action dated Nov. 30, 2015", 36 pgs.
"U.S. Appl. No. 14/124,767, Non Final Office Action dated Aug. 13, 2015", 28 pgs.
"U.S. Appl. No. 14/124,767, Notice of Allowance dated Jun. 14, 2016", 12 pgs.
"U.S. Appl. No. 14/124,767, Preliminary Amendment filed Dec. 6, 2013", 9 pgs.
"U.S. Appl. No. 14/124,767, Response filed Feb. 1, 2016 to Final Office Action dated Nov. 30, 2015", 12 pgs.
"U.S. Appl. No. 14/124,767, Response filed Oct. 29, 2015 to Non Final Office Action dated Aug. 13, 2015", 10 pgs.
"U.S. Appl. No. 14/731,668, Final Office Action dated Jul. 19, 2016", 16 pgs.
"U.S. Appl. No. 14/731,668, Non Final Office Action dated Feb. 26, 2016", 19 pgs.
"U.S. Appl. No. 14/731,668, Preliminary Amendment filed Aug. 14, 2015", 6 pgs.
"U.S. Appl. No. 14/731,669, Response filed Jun. 27, 2016 to Non Final Office Action dated Feb. 26, 2016", 8 pgs.
"Chinese Application Serial No. 201210220574.0, Amendment filed Apr. 16, 2013". W/ English Claims, 8 pgs.
"Chinese Application Serial No. 201210220574.0, Office Action dated Jan. 15, 2016", W/ English Translation, 8 pgs.
"Chinese Application Serial No. 201210220574.0, Office Action dated Mar. 30, 2015", W/ English Translation, 16 pgs.
"Chinese Application Serial No. 201210220574.0, Office Action dated Jul. 2, 2014", W/ English Translation, 21 pgs.
"Chinese Application Serial No. 201210220574.0, Office Action dated Oct. 10, 2015", W/ English Translation, 6 pgs.
"Chinese Application Serial No. 201210220574.0, Response filed Mar. 25, 2016 to Office Action dated Jan. 15, 2016", W/ English Claims, 11 pgs.
"Chinese Application Serial No. 201210220574.0, Response filed Jun. 15, 2015 to Office Action dated Mar. 30, 2015", W/ English Claims, 10 pgs.
"Chinese Application Serial No. 201210220574.0, Response filed Nov. 17, 2014 to Office Action dated Jul. 2, 2014", W/ English Claims, 10 pgs.

"Chinese Application Serial No. 201210220574.0, Response filed Dec. 18, 2015 to Office Action dated Oct. 10, 2015", W/ English Claims, 13 pgs.
"Chinese Application Serial No. 201280036196.9, Office Action dated Jul. 21, 2016", W/ Machine Translation, 14 pgs.
"Chinese Application Serial No. 201380060673.X, Voluntary Amendment dated Oct. 28, 2015", w/ English Claims, 17 pgs.
"European Application Serial No. 12804461.7, Communication Pursuant to Article 94(3) EPC dated Aug. 10, 2016", 5 pgs.
"European Application Serial No. 12804461.7, Extended European Search Report dated Feb. 17, 2015", 7 pgs.
"European Application Serial No. 12804461.7, Response filed Sep. 10, 2015 to Extended European Search Report dated Feb. 17, 2015", 6 pgs.
"European Application Serial No. 12814178.5, Extended European Search Report dated Apr. 9, 2015", 10 pgs.
"European Application Serial No. 12814178.5, Response filed to Oct. 15, 2015 Extended European Search Report dated Apr. 9, 2015", 26 pgs.
"European Application Serial No. 13867091.4, Extended European Search Report dated Jun. 16, 2016", 6 pgs.
"European Application Serial No. 13874312.5, Extended European Search Report dated Aug. 16, 2016", 10 pgs.
"European Application Serial No. 13874312.5, Preliminary Amendment filed Jul. 2, 2015", 9 pgs.
"European Application Serial No. 15192254.9, Extended European Search Report dated Jan. 18, 2016", 8 pgs.
"Hotspot 2.0 (Release 2) Technical Specification: Version 1.20a", Wi-Fi Alliance Technical Committee Hotspot 2.0 Technical Task Group, (2012), 145 pgs.
"International Application Serial No. PCT/US2011/059367, International Preliminary Report on Patentability dated May 15, 2014", 7 pgs.
"International Application Serial No. PCT/US2011/059367, International Search Report dated Apr. 24, 2012", 3 pgs.
"International Application Serial No. PCT/US2011/059367, Written Opinion dated Apr. 24, 2012", 5 pgs.
"International Application Serial No. PCT/US2012/040470, International Preliminary Report Patentability dated Jan. 16, 2014", 6 pgs.
"International Application Serial No. PCT/US2012/040470, Search Report dated Dec. 27, 2012", 3 pgs.
"International Application Serial No. PCT/US2012/040470, Written Opinion dated Dec. 27, 2012", 3 pgs.
"International Application Serial No. PCT/US2012/047403, International Preliminary Report on Patentability dated Jan. 30, 2014", 6 pgs.
"International Application Serial No. PCT/US2012/047403, International Search Report dated Jan. 21, 2013", 3 pgs.
"International Application Serial No. PCT/US2012/047403, Written Opinion dated Jan. 21, 2013", 4 pgs.
"International Application Serial No. PCT/US2013/044238, International Search Report dated Aug. 27, 2013", 3 pgs.
"International Application Serial No. PCT/US2013/044238, Written Opinion dated Aug. 27, 2013", 6 pgs.
"International Application Serial No. PCT/US2013/052743, International Preliminary Report on Patentability dated Aug. 20, 2015", 7 pgs.
"International Application Serial No. PCT/US2013/052743, International Search Report dated Nov. 1, 2013", 3 pgs.
"International Application Serial No. PCT/US2013/052743, Written Opinion dated Nov. 1, 2013", 5 pgs.
"Japanese Application Serial No. 2012-128614, Office Action dated Feb. 4, 2014", w/English translation, 4 pgs.
"Japanese Application Serial No. 2012-128614, Office Action dated May 7, 2013", w/English translation, 9 pgs.
"Japanese Application Serial No. 2012-128614, Response filed Apr. 25, 2014 to Office Action dated Feb. 4, 2014", w/English claims, 17 pgs.
"Japanese Application Serial No. 2012-128614, Response filed Aug. 7, 2013 to Office Action dated May 7, 2013", w/English claims, 17 pgs.

(56) References Cited

OTHER PUBLICATIONS

"Japanese Application Serial No. 2012-128614, Voluntary Amendment dated Jun. 28, 2012", w/English claims, 4 pgs.
"Japanese Application Serial No. 2014-223143, Notice of Reason for Rejection dated Sep. 15, 2015", W/ English Claims, 2 pgs.
"Japanese Application Serial No. 2014-223143, Response filed Dec. 21, 2015 to Notice of Reason for Rejection dated Sep. 15, 2015", W/ English Claims, 14 pgs.
"Japanese Application Serial No. 2014-223143, Voluntary Amendment filed Nov. 25, 2014", W/ English Claims, 13 pgs.
"Japanese Application Serial No. 2015-543034, Office Action dated Apr. 19, 2016", With English Translation, 7 pgs.
"Japanese Application Serial No. 2015-543034, Voluntary Amendment dated Mar. 14, 2016", w/ English Claims, 11 pgs.
"Korean Application Serial No. 10-2012-57704, Office Action dated Aug. 17, 2012", w/English translation, 5 pgs.
"Korean Application Serial No. 10-2012-57704, Response filed Oct. 17, 2012 to Office Action dated Aug. 17, 2012", w/English claims, 21 pgs.
"Korean Application Serial No. 2014-7002621, Non Final Office Action dated Jan. 16, 2015", W/ English Translation, 8 pgs.
"Korean Application Serial No. 2014-7002621, Response filed Mar. 16, 2015 to Non Final Office Action dated Jan. 16, 2015", W/ English Claims, 23 pgs.
"Korean Application Serial No. 2015-7033200, Office Action dated Feb. 18, 2016", W/ English Translation, 8 pgs.
"Korean Applicaton Serial No. 2015-7006635, Non Final Office Action dated Apr. 29, 2015", W/ English Translation, 5 pgs.
"Network Architecture Architecture, detailed Protocols and Procedures WiMAX® Over-The-Air General Provisioning System Specification", WMF-T33-103-R015v03, (Nov. 30, 2010), 29 pgs.
"Roaming Indicator—CDGWiki", [Online]. Retrieved from the Internet: <https://web.archive.org/web/20100216234113/http://wiki.cdg.org/wiki/Roaming_Indicator>, (Feb. 16, 2010), 1 pg.
"The Future of Hotspots: Making Wi-Fi as Secure and Easy to Use as Cellular", Cisco, White Paper, (2012), 9 pgs.
"Wi-Fi Certified Passpoint", Xirrus White Paper, (2012), 5 pgs.
"Wi-Fi Certified Passpoint (Release 1) Deployment Guidelines", Wi-Fi Alliance Hotspot 2.0 Technical Task Group. Version 1.0, (Oct. 2012), 25 pgs.
"Wi-Fi Certified Passpoint Architecture for Public Access", Aruba White Paper, (2011), 15 pgs.
"WiMAX Forum Network Architecture (Stage 2 and Stage 3: Detailed Protocols and Procedures)[WiMAX Over-The-Air Provisioning & Activation Protocol based on OMA DM Specifications", Wimax Forum Network Architecture—Wimax Over-The-Air Provisioning & Activation Protocol Based on Oma Dm Specifications, vol. Release 1.5, No. Version 1.0.0, (Mar. 26, 2008), 83 pgs.
"WiMAX Forum Network Architecture (Stage 2 and Stage 3: Detailed Protocols and Procedures)[WiMAX Over-The-Air Provisioning & Activation Protocol based on OMA DM Specifications", WMF-T33-104-R015v02, (Mar. 26, 2008), 78 pgs.
"WiMAX Forum Network Architecture , detailed Protocols and Procedures Over-The-Air Provisioning & Activation Protocol based on TR-069 Specification", Wimax Forum WM F-T33-105-R015v01, (Nov. 21, 2009), 73 pgs.
"WISPr 2.0", Wireless Broadband Alliance. Doc Ref. No. WBA/RM/WISPr Version 01.00, (Apr. 8, 2010), 58 pgs.
"WPATM Deployment Guidelines for Public Access Wi-Fi® Networks", [Online]. Retrieved from the Internet: <http://www.paratorpes.es/cisco/WPA_for_Public_Access_Final.pdf>, (Oct. 28, 2004), 47 pgs.
Aboba, Bernard, "IEEE P802.11 Wireless LANs: Virtual Access Points", [Online]. Retrieved from the Internet: <URL: http://aboba.drizzlehosting.com/IEEE/11-03-154r1-I-Virtual-Access-Points.doc>, (May 22, 2003), 13 pgs.
Cinu, Chacko, "OTA-DM (Over the Air Device Management)", [Online]. Retrieved from the Internet: <http://hosteddocs.ittoolbox.com/CC012507.pdf>, (Feb. 2, 2007), 4 pgs.
Dantu, Ram, et al., "EAP methods for wireless networks", Computer Standards & Interfaces vol. 29 Issue 3, (Mar. 2007), 289-301.
Latze, Carolin, et al., "Roaming, Accounting and Seamless Handover in EAP-TLS Authenticated Networks", Telecommunications and Computer Networks, 16th International Conference on,IEEE, (2008), 85-89.
Nie, Pin, et al., "Flexible Single Sign-On for SIP: Bridging the Identity Chasm", IEEE International Conference on Communications, 2009. ICC '09., (2009), 1-6.
Pfitzmann, Birgit, "Privacy in enterprise identity federation—policies for Liberty 2 single sign on pet 2003", Proc. 3rd Workshop on Privacy Enhancing Technologies (PET 2003)., (2003), 1-19.
Stephenson, Dave, et al., "Secondary NAI Realm List", IEEE 802.11-09/1214r2, IEEE mentor, (Nov. 2009), 6 pgs.

* cited by examiner

ONLINE SIGNUP PROVISIONING TECHNIQUES FOR HOTSPOT CONNECTIONS

PRIORITY APPLICATION

This application is a continuation of U.S. patent application Ser. No. 14/124,767, filed Dec. 9, 2013, which is a U.S. National Stage Filing under 35 U.S.C. 371 from International Patent Application Serial No. PCT/US2013/052743, filed Jul. 30, 2013, and published on Aug. 14, 2014 as WO 2014/123576 A1, which claims the benefit of priority to U.S. Provisional Application Ser. No. 61/761,167, filed Feb. 5, 2013, which is incorporated herein by reference in its entirety.

TECHNICAL FIELD

Embodiments pertain to operations and communications performed by electronic devices in wireless networks. Some embodiments relate to authentication and provisioning operations used for establishing wireless network connections with a wireless network.

BACKGROUND

Wireless network operators are deploying a large number of access points to address growing data demands and provide a better quality of experience for client devices. These access points may implement standards from the IEEE 802.11 and Wi-Fi Alliance standards families to provide a common user experience (e.g., to operate as a "Wi-Fi Hotspot"). With use of these standards, infrastructure configurations are evolving to enable user and device roaming. One mechanism to facilitate user and device roaming is provisioning, which enables devices associated with a subscription to easily visit and authenticate with different wireless networks. For example, provisioning may allow a wireless network device to seamlessly authenticate and connect with hotspots located at different locations.

Operations in the provisioning process involve the exchange and implementation of operator policies and subscriptions (e.g., the exchange of user credentials) with the Wi-Fi enabled devices. Existing techniques for online hotspot provisioning, however, often provide a dependency on a browser software application to fully exchange provisioning information, such as deploying a specific plug-in within a browser for the hotspot signup and authentication process. Use of a plug-in and browser-based solution may result in development and support to be provided for each device platform and browser type. In addition, if a user installs another browser or disables the particular plug-in, the provisioning process may not successfully complete. The dependency of the authentication process on a browser-based solution may lead to technical support issues and service interruptions.

DETAILED DESCRIPTION

Figure 1:
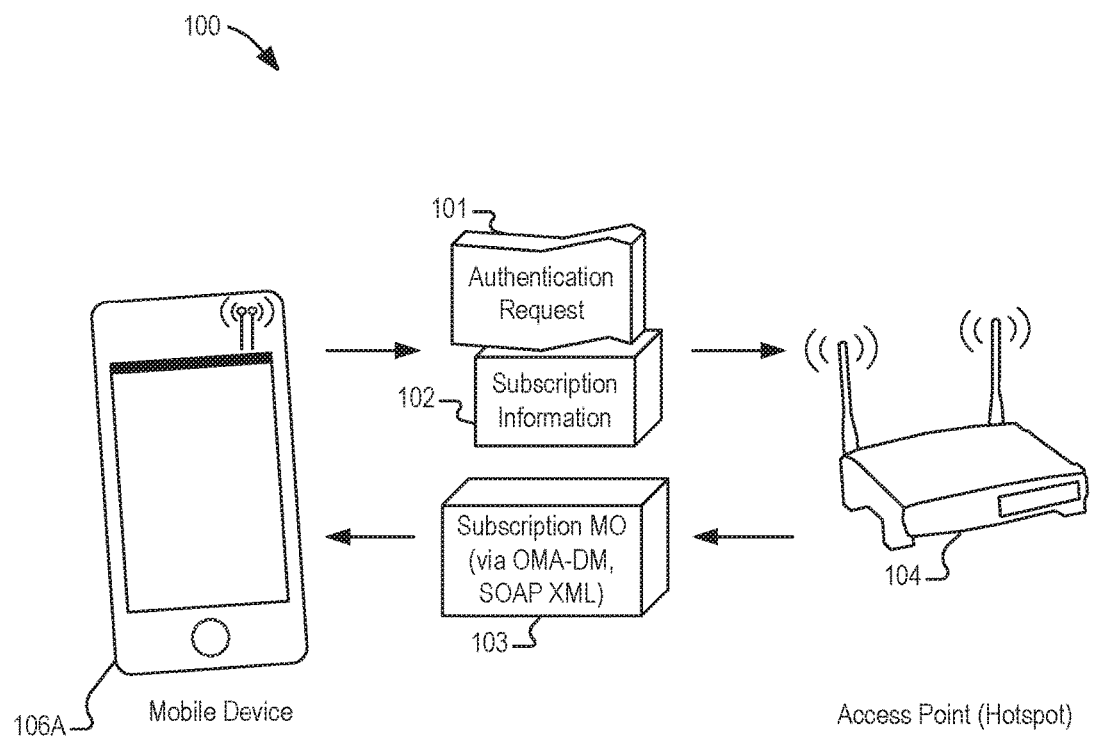
FIG. 1 illustrates data operations for performing provisioning within an online signup architecture of a wireless network according to a further described example.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Various techniques and configurations described herein relate to provisioning operations of computing devices connecting to a wireless network. As further described, these techniques may be deployed within a wireless network provided by a Wi-Fi hotspot, to enable communication of a subscription management object (MO) to a client wireless network device. This subscription MO may include information to assist the client wireless network device to select and authenticate with a particular wireless network (for example, to select a preferred network among multiple available networks). The exchange of the subscription MO in a hotspot setting may enable a client device to roam to wireless networks at other locations and quickly authenticate with the best available network, assisting operations that establish a connection for the client device.

Flows and signaling mechanisms are described herein that exchange the subscription MO between an access point and a client wireless network device without using specific HTTP sessions that require use of a browser or browser plug-in. Removing the browser dependency may help facilitate provisioning operations to be performed in all operating systems and platforms. It follows that the exchange of the subscription MO without dependency on a browser or browser environment can reduce development and testing times that would be otherwise needed for enabling plugins.

In one example, multiple call flows of the online signup processing in Hotspot 2.0 Release-2 specification are modified. The online signup processing may be designated to facilitate the exchange of the subscription MO in a standard provisioning mechanism, such as an OMA-DM or SOAP-based provisioning mechanism. As further described herein, the call flows within the online signup processing may be modified to include additional signaling between an HTTP registration web server and an Online Sign-Up (OSU) server using a session key. The key is used between the HTTP registration web server and the OSU server to tie the session to a particular user or user device and exchange data independent of a HTTP browser-based session.

As network operators begin to expand deployments, the operators are interested in operations for provisioning of operator policy and subscriptions (user credentials) on enabled mobile devices. Standards such as Wi-Fi Alliance Hotspot 2.0 Release 2 have begun to define standards-based operations for provisioning of operator policies and subscriptions with Wi-Fi enabled mobile devices. Provisioning information may be used by network operators, for example, to guide network discovery and selection and indicate which Wi-Fi networks that known devices should or should not connect, and the like. Likewise, provisioning information may be used by a mobile device, prior to association with the network, to determine a network's configuration and reachability information, determine available services, determine a preferred network, and otherwise collect information on new networks and network locations.

FIG. 1 provides an overview of operations 100 performed for the exchange of provisioning data used with a network authentication process for a client device in a wireless network in connection with one example. As shown, a mobile device 106A transmits an authentication request 101 to an access point 104 (e.g., a hotspot). This authentication request may be accompanied by subscription information 102 unique to the mobile device 106A or the user of the mobile device 106A. In some examples, the subscription information may be provided using a user interface such as a sign-in webpage or software application used to provide login credentials, select and pay for network access, and obtain like information.

In response to the processing of the authentication request 101 and the subscription information 102, the access point 104 contacts the appropriate service provider and responds with subscription-based provisioning information. The provisioning information may be used to guide the mobile device 106A with subscription information, roaming information, network discovery and selection information, policies, and other aspects of authentication and roaming interoperability. Such provisioning information may be provided within a subscription MO 103 transmitted back to the mobile device 106A using OMA-DM, SOAP XML, or other mechanisms.

Figure 2:
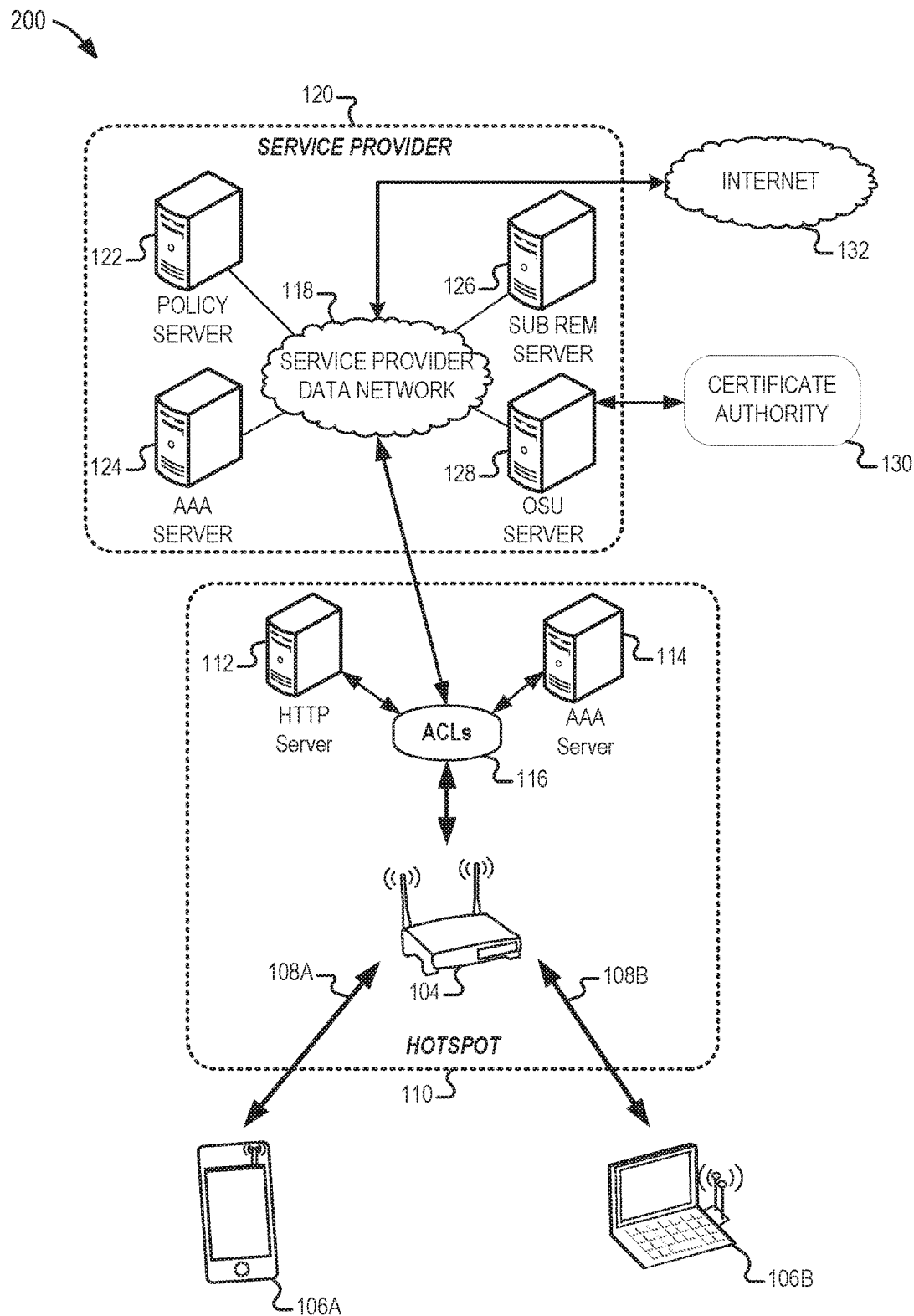
FIG. 2 illustrates a network configuration for an online signup architecture of a wireless network according to a further described example.

FIG. 2 illustrates an example network configuration 200 used in connection with further examples provided herein. The online signup architecture illustrated with network configuration 200 may be facilitated by a wireless network operating according to a standard from an IEEE 802.11 wireless standards family (e.g., 802.11a, 802.11b, 802.11g, 802.11n, 802.11ac specification standards) and other specifications such as the Wi-Fi Alliance Hotspot Specification (e.g., Hotspot 2.0 specification).

In some examples, subscription and policy provisioning for network discovery and selection (ND&S) may be carried out using either OMA-DM or SOAP-XML protocols. Subscription and ND&S policy data in the Hotspot 2.0 specification, for example, may be transported within a defined PerProviderSubscription Management Object (MO). (The same PerProviderSubscription MO may be used regardless of whether the transfer protocol is OMA-DM or SOAP-XML). In many cases, a Service Provider decides whether to use OMA-DM or SOAP-XML procedures to perform provisioning, and the client device is informed of the protocol supported.

As shown in FIG. 2, the hotspot 110 operates with use of a wireless network access point 104 in communication with processing servers. The hotspot 110 provides network communication between the access point 104 and wireless network communicating devices (e.g., smartphone 106A and computing device 106B) through wireless network connections (e.g., wireless network connection 108A to the smartphone 106A and wireless network connection 108B to the computing device 106B). Within operations of the hotspot 110, the processing servers may operate to facilitate an authentication and provisioning of wireless network client devices. These include an HTTP server 112 used to host webpages and data services that conduct registration operations, and an Authentication, Authorization and Accounting (AAA) server 114 that may be used as an AAA proxy to relay messages to the AAA server of supported service providers (e.g., AAA server 124 in service provider 120).

Provisioning is used to provide a mobile device with information on an unknown network. Thus, if the mobile device is not authenticated with an access control list (ACL) 116 provided from the hotspot AAA server 114, a connection to the service provider 120 and the service provider data network 118 may be established to obtain subscription provisioning information. The hotspot 110 may include access restrictions for the mobile device, to restrict mobile device connectivity to the subscription servers of the service provider data network 118 during the credential provisioning process, and to prevent access to the internet 132 until authenticated.

The hotspot 110 receives data from a service provider data network 118 operated by a service provider 120. The service provider data network 118 facilitates the transfer of data from the internet 132 and operates various subscription servers to manage provisioning operations. These subscription servers may include a policy server 122, an AAA server 124, a Subscription Remediation (Sub Rem) server 126, and an Online Sign-Up (OSU) server 128 (with the OSU 128 configured for communicating with an internal or external certificate authority 130).

The policy server 122 may be used to provision ND&S policies to mobile devices. The policy node of the Subscription MO may be used to inform the mobile device of how to contact this server. The AAA server 124 may be used to authenticate subscribers using the credentials obtained from the OSU Server 128. The OSU Server 128 may be configured to register new subscribers and provision them with credentials. The Sub Rem Server 126 is used to correct problems known to the service provider with the subscriber's credentials, provisioned data (e.g., the Subscription MO), or the subscription itself. The subscription update node of the Subscription MO may be used to inform the mobile device how to contact this server.

Receipt of a subscription MO, as currently defined in the Hotspot 2.0 specification, may provide a dependency on a HTTP session within a browser and connection manager software launched within the mobile device. For example, a browser may be configured with a plug-in used to capture the subscription MO object in response to an HTTP request. A connection manager software application may operate on the mobile device to interact with a browser, intercept the appropriate authentication message(s), determine provisioning information, and complete the provisioning process.

Figure 3:
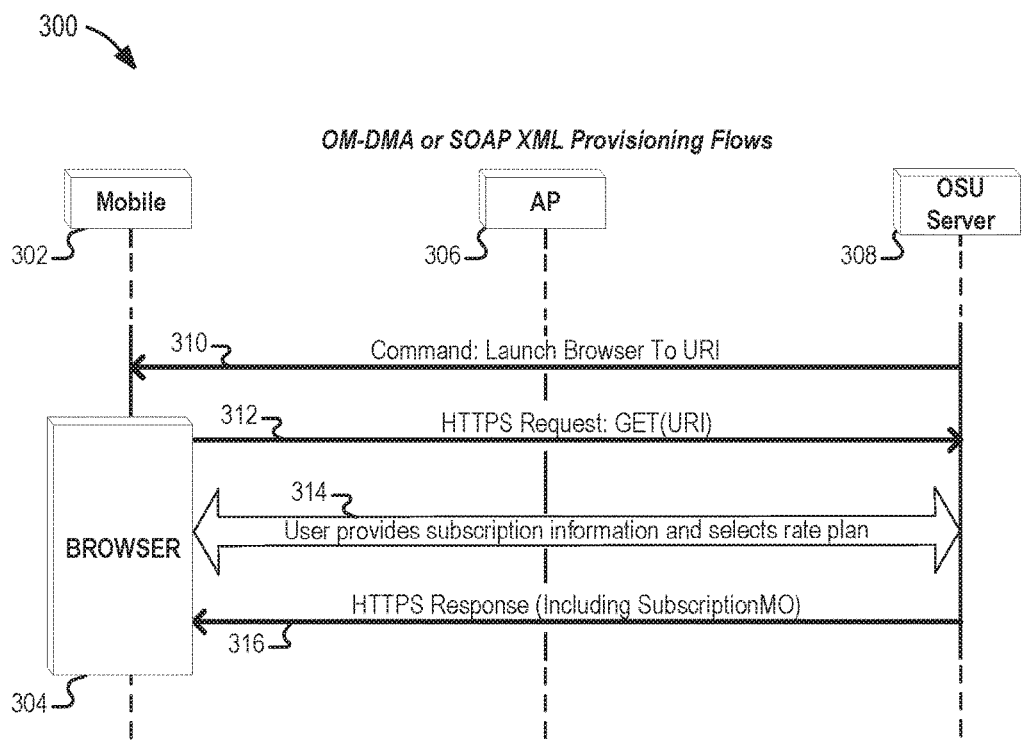
FIG. 3 illustrates a data sequence for a browser-based operation used for obtaining a subscription management object in a provisioning flow according to a further described example.

FIG. 3 provides an illustration of example operations 300 for performing provisioning using a browser-based technique. The operations 300 may be applicable to provisioning processes using either SOAP XML or OMA-DM communication mechanisms. This provisioning flow is illustrated as being performed between a mobile device 302 and a server 308 (such as an OSU server), via connections facilitated by an access point 306.

The operations for performing provisioning include receiving a command from the server 308 to launch a browser 304 to a specific uniform resource indicator (URI) (operation 310) to access a specific webpage. The browser 304 operating on the mobile device 302 will then launch and conduct a HTTPS GET request within a browser to retrieve a webpage accessible at the URI (operation 312). With this webpage, the user may provide subscription information, a selection of a rate plan, authentication information, and like information to associate with the appropriate network (operation 314). In response to this webpage transaction, the server will respond with an acknowledgment provided in an HTTPS response to the browser 304, and include provisioning information in the Subscription MO (operation 316) that can be captured by a plug-in of the browser 304.

In the example of FIG. 3, a connection manager or other software operating at the mobile device 302 is configured to detect completion of the HTTPS response, in order to receive the provisioning information in the Subscription MO and complete the provisioning process. Again, this provisioning information is provided in the HTTPS session launched and conducted by a browser 304. The subscription MO may be intercepted in the browser 304 and provided to ongoing processes in the mobile device 302 with use of a specific browser plug-in, for example.

The use of an HTTP/HTTPS session in the browser 304 and the successful receipt of the Subscription MO for the connection manager, however, is dependent on deployment of a plugin solution for each platform and browser type. It is often not practical for device vendors to implement and support all possibilities of browsers and platforms. In addition, even though a connection manager might detect the default browser and install the proper plug-in, user behavior and preferences may prevent its usage. For example, a user may install a new, unsupported browser as the default browser, or delete the supported browser. Users may also disable the browser plug-in. Thus, in many cases, the connection manager will be unable to capture the subscription MO received in the browser 304. Such issues stem from the use of the browser HTTP session to communicate the subscription MO.

Figure 4A:
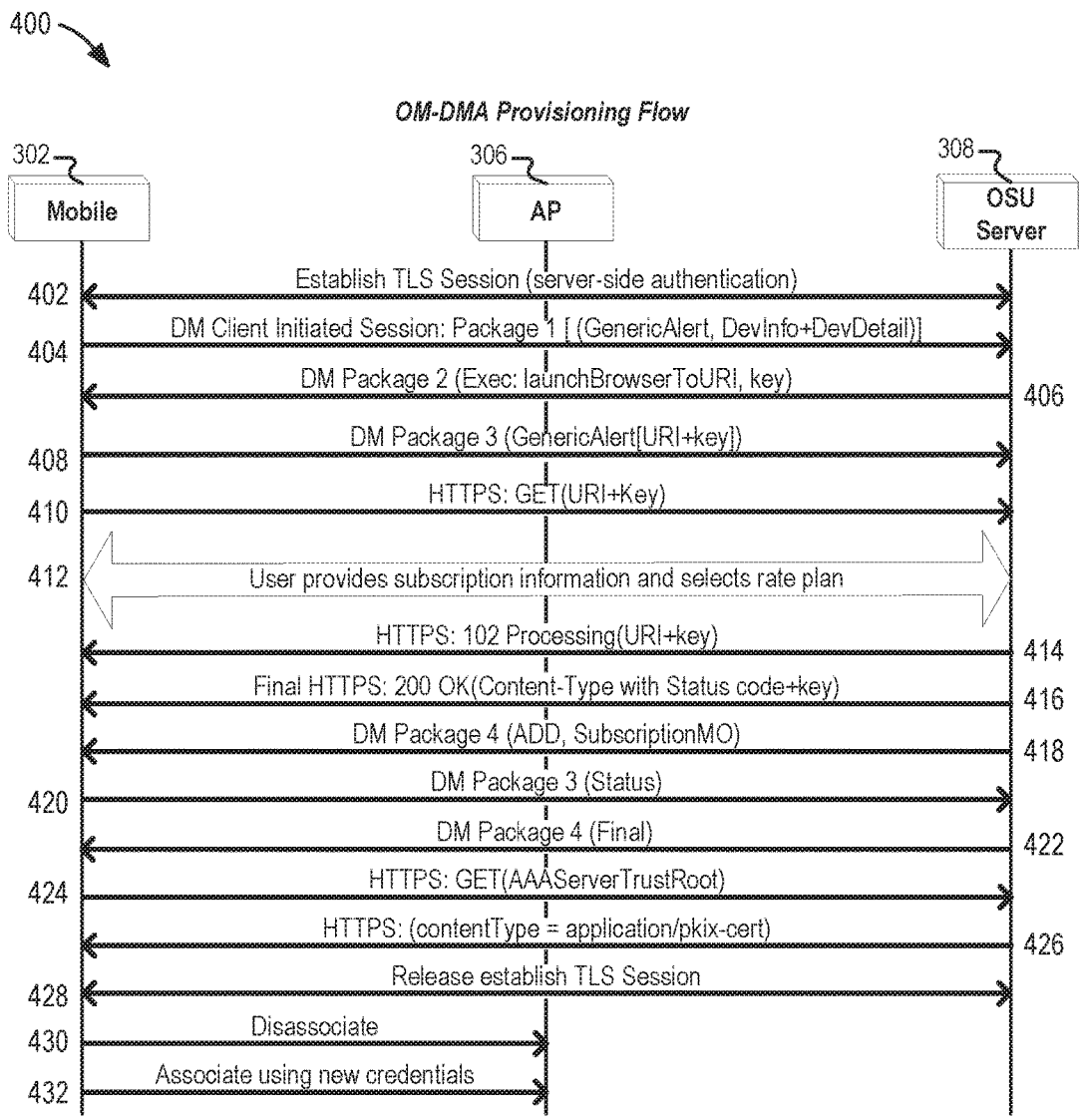
FIG. 4A illustrates a data sequence for an Open Mobile Alliance Device Management (OMA-DM) provisioning flow obtaining a subscription management object outside a browser session according to a further described example.

FIG. 4A provides an example provisioning process 400 used in connection with OMA-DM operations. The provisioning process specifically illustrates an OMA-DM provisioning with session key, signaling and transmitting MO outside a browser HTTP session. The OMA-DM provisioning flow in FIG. 4A illustrates the following operations between the mobile device 302, an access point 306, and a server 308 (e.g., an OSU server).

First, operations performed in the OMA-DM provisioning flow include establishment of a communication session (operation 402), which may include establishing a Transport Layer Security (TLS) or other encrypted session between the mobile device 302 and the server 308 (initiating the communication session based on server-side authentication). A DM package is transmitted from the mobile device 302 to the server 308, indicating the reason for contacting the server 308 (operation 404). For example, the reason may indicate that the mobile device 302 wants to establish a new subscription with the service provider. The DM package may include DevInfo and DevDetail MOs and a Generic Alert indicating the reason for contacting the server 308. (The reason element in the Generic Alert may be set to a value such as 'SubscriptionCreation').

The server 308 may use the information provided to determine provisioning characteristics, such as user/password or certificate credentials. The server 308 returns a DM package including a command to launch a browser to a URI and a key generated by the server to link the HTTPS session with the DM session (operation 406). (Upon completion of the HTTP session, using the key generated, a HTTP server serving the webpage at the URI is configured to signal the server 308 with the completion of the user input. As explained in the following operations, this enables the server 308 to provide the Subscription MO if the processing of user inputs is completed successfully).

In response to the command to launch a browser to an address with the specified URI+Key, the mobile device 302 sends a DM package to the server 308 containing the URI and Key (operation 408). This DM package provides a request that the OMA client be notified upon the completion of the user's input registration data (or other authentication/registration data). The mobile device 302 then launches the browser and establishes a secure HTTPS connection to the URI returned in operation 406, such as by sending an HTTPS GET request to the Server URI+Key (operation 410).

Next, using the webpage, the user provides subscription information, selects a rate plan, or provides other registration data to facilitate registration with the server 308 (operation 412). The Server 308 may return interim responses (operation 414), such as 102 status code HTTP responses being sent every 30 seconds or a like time interval to prevent HTTP connection timeouts until the user input processing is completed. At the end of the subscription provisioning process, the server 308 returns information indicating success or another status code of the process (operation 416). In some examples, this may be provided in a sppUserInputResponse XML instance document. The sppUserInputResponse XML instance document may be returned having its HTTP content-type set to "Content-Type with Status code+ Key."

Within the TLS communication session, but outside of the HTTP session, the server 308 sends a DM package to the mobile device (operation 418). This DM package contains the subscription MO (e.g., a PerProviderSubscription MO), and information that enables the MO to be processed (e.g., a command ADD, specifying the location of the PerProviderSubscription MO to be added to the OMA DM management tree on the mobile device).

Other operations used to facilitate the exchange of data in the connection may be performed, including the mobile device 302 sending a DM Package indicating the status of the MO processing (operation 420), a response received at the mobile device 302 having a DM Package to indicate the end of the OMA DM transaction (operation 422), and a HTTPS transaction to retrieve a certificate specified in the Subscription MO (operation 424 and operation 426). The mobile device 302 and server 308 may then release the communication session (operation 428) (e.g., TLS session) that was established (from operation 402). The mobile device may then disassociate from the Wi-Fi access point 306 (operation 430) and if the subscription was established successfully, the mobile device may associate with the new credentials with the AP 306 or another AP indicated in the subscription MO (operation 432).

Figure 4B:
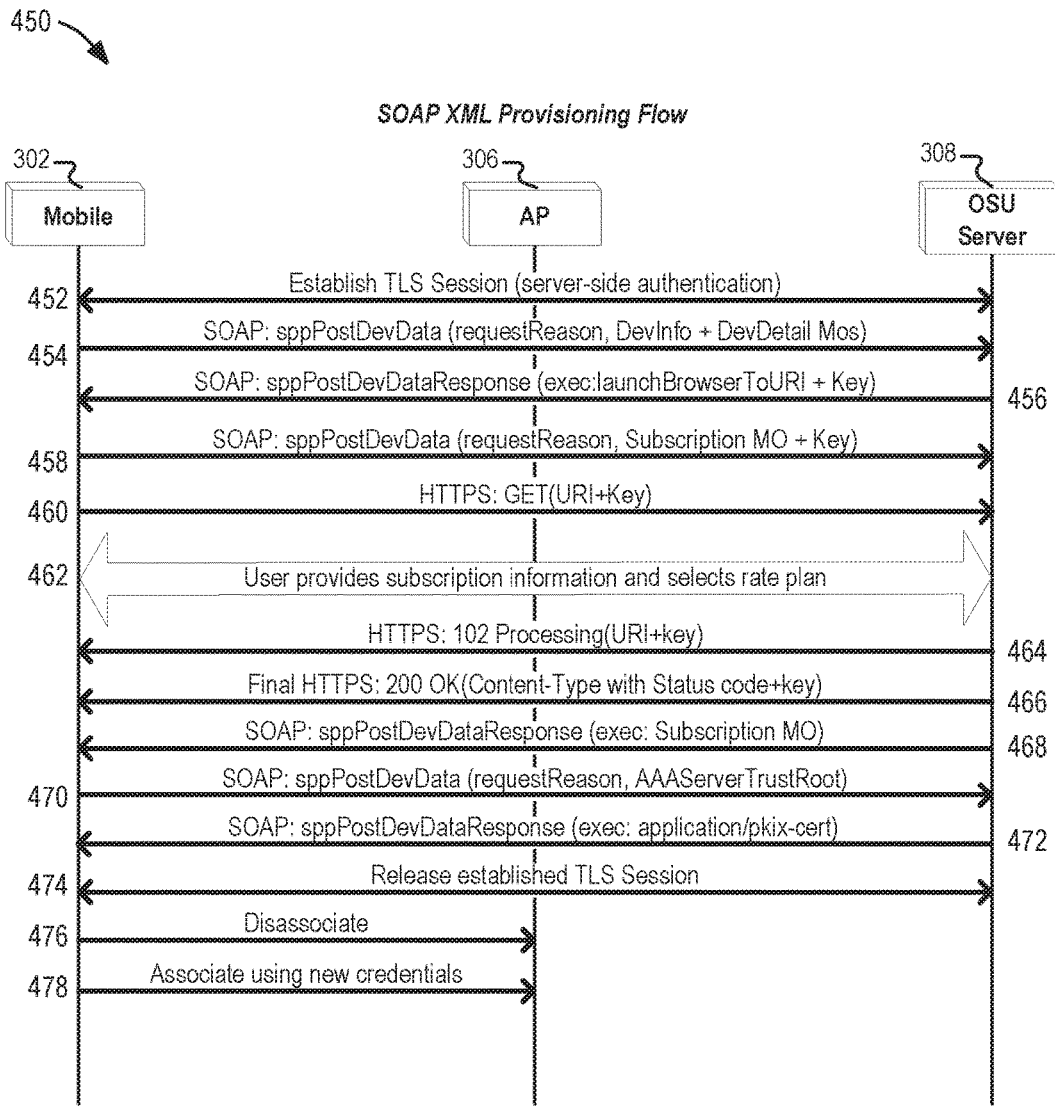
FIG. 4B illustrates a data sequence for a Simple Object Access Protocol-Extensible Markup Language (SOAP-XML) provisioning flow obtaining a subscription management object outside a browser session according to a further described example.

FIG. 4B illustrates an example provisioning process 450 used in connection with SOAP-XML operations. The operations between mobile device 302, access point 306, and server 308 are generally similar to those depicted in FIG. 4A, but provide an example for use with SOAP message exchanges in place of OMA-DM data package exchanges.

As shown, operations performed in the SOAP XML provisioning flow include establishment of a communication session, which may include establishing a TLS session between the mobile device 302 and the server 308 (operation 452) with server-side authentication to initiate the session. A SOAP message is sent from the mobile device to the server, indicating the reason for contacting the server 308 (operation 454). For example, the reason may indicate that the mobile device 302 may want to register for credentials with the service provider. The SOAP message may include DevInfo and DevDetail MOs and a Generic Alert indicating the reason for contacting the OSU Server. (The reason element in the Generic Alert may be set to a value such as 'SubscriptionRegistration').

The server 308 returns a SOAP message including a command to launch a browser to a URI and a key generated by the server 308 (operation 456). (The server 308 uses the key to link the HTTP session with the SOAP session so that it can provide the Subscription MO upon successful completion of user input registration processing). The mobile device 302 transmits a sppPostDevData SOAP method (operation 458), with the content of the request informing the server to send the Subscription MO when user input registration associated with the key is successfully completed.

The mobile device 302 launches the browser and establishes a secure HTTPS connection to the returned URI (operation 460), and sends an HTTPS GET request to the Server URI+Key. Again, similar to the OMA-DM operations 412, 414, and 416, the user provides information in the HTTPS session to facilitate registration with the server 308 (operation 462), receive and process interim responses to keep the connection alive (operation 464), and receive a success indication upon completion of registration with the server (operation 466).

Within the TLS communication session, but outside of the HTTP session, the server 308 sends a sppPostDevDataResponse SOAP message containing subscription MO to the mobile device 302 (operation 468). The mobile device may use the sppPostDevData SOAP message to obtain further authentication information, such as transmitting a sppPostDevDataResponse message with an AAAServerTrustRoot specified in the subscription MO (operation 470). The response received from the server 308 may include an authentication certificate (operation 472).

Again, similar to operations 424, 426, 428, the mobile device 302 and server 308 may then release the communication session (operation 474) (e.g., the TLS session) that was established (from operation 452). The mobile device 302 may then disassociate from the Wi-Fi access point 306 (operation 476) and if the subscription was established successfully, the mobile device may associate with the new credentials with the AP 306 or another AP indicated in the subscription MO (operation 478).

As a comparison of FIGS. 4A and 4B with the techniques illustrated in FIG. 3, the HTTP server only returns a status code (e.g., status code 200) to the web browser on the mobile device 302. The subscription MO in processes 400, 450 is not embedded in an HTTP response received by a browser, which would require the mobile device to intercept the session using a plugin to obtain the MO. With communication of the subscription MO in the communication session but not the HTTP session, software applications such as a connection manager operating on the client is no longer dependent on browser interaction to obtain the subscription MO. Further, because the server (such as an OSU server) is informed about the completion of user input, it can tie the provision of the MO object to the specific client to a success of the session using the provided key. Thus, a connection manager operating on the mobile device may receive the subscription MO and handle it as instructed without a browser or interaction with a web browser.

In addition to providing the Subscription MO in response to subscription provisioning, the previously described techniques may be adapted to communicate additional or other MOs within flows. This includes flows used for provisioning username/passwords or certificates, and subscription remediation using OMA DM or SOAP based mechanisms.

Figure 5:
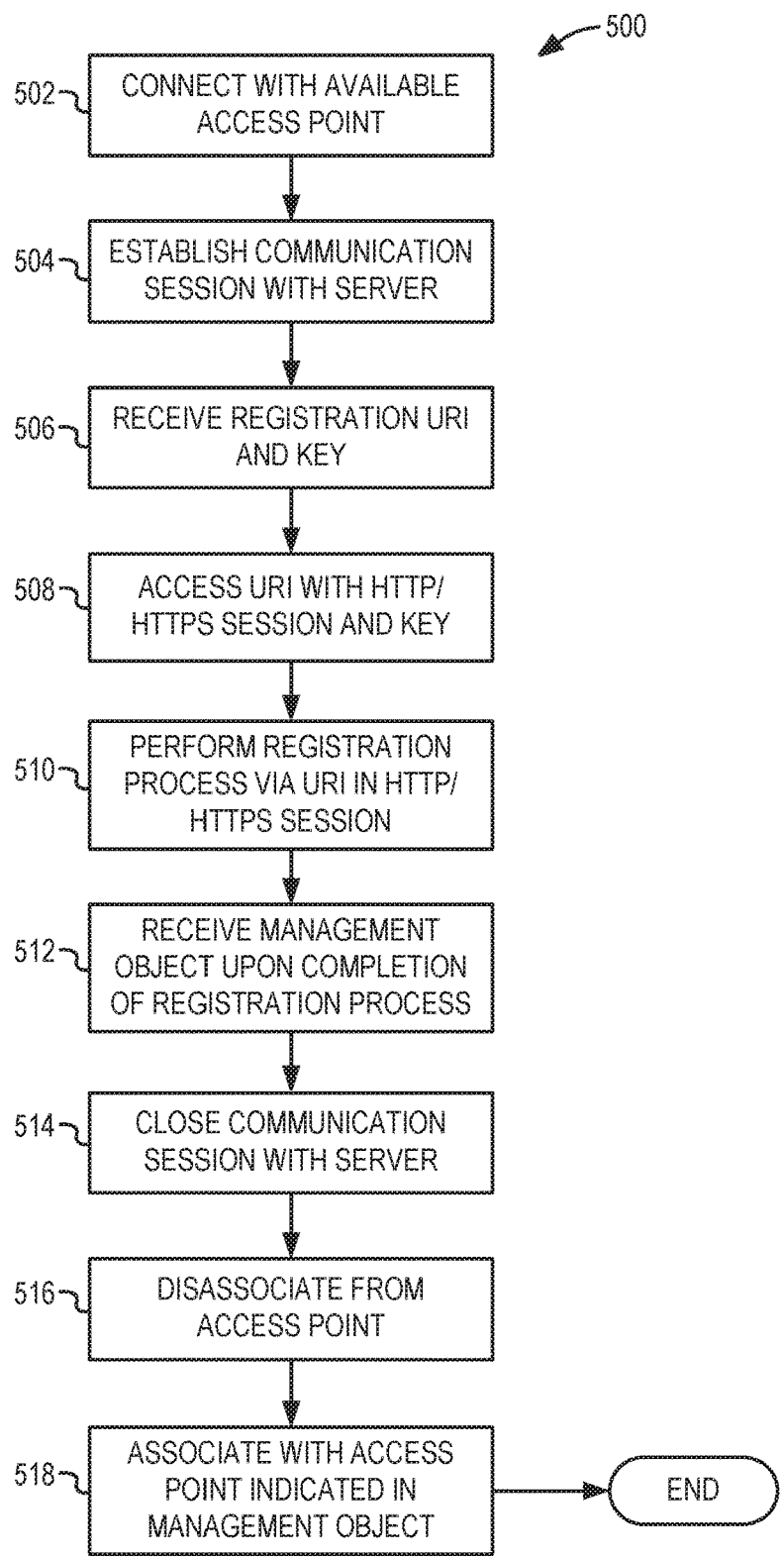
FIG. 5 illustrates a flowchart of an example provisioning flow of operations performed by a wireless client device according to a further described example.

FIG. 5 provides an example illustration of an operation flow 500 performed at a client wireless device for obtaining provisioning information for wireless network connectivity. It will be understood that the operation flow 500 provides a general outline of a sequence of operations conducted at an example client, but some of the operations may be conducted in a different sequence, substituted or replaced by other operations, or removed from the flow.

Provisioning operations are commenced through a wireless network connection between the client and an available access point (operation 502). Using this connection, a communication session is established with a server such as an online sign-up server (operation 504). In the communication session, the client receives a registration URI and key (or other unique identifier to associate the session) (operation 506).

The client then may perform operations to access the URI in an HTTP/HTTPS session, with access to the URI providing the key or other unique identifier (operation 508). This operation is followed by user operations conducted at the client to perform the registration process (for example, in a webpage accessible at the URI) (operation 510). Within the communication session, but outside of the HTTP/HTTPS session with the URI, the client receives the management object (operation 512). The management object is triggered upon completion of the registration process, for example, based on a communication between the web server hosting the registration and the OSU server.

Upon successful communication of the management object to the client, the communication session with the OSU server may be closed (operation 514). The client may then disassociate from the access point (operation 516) and associate with the access point indicated in the management object (operation 518). In some cases, the client will associate with the same access point as used for the provisioning.

Figure 6:
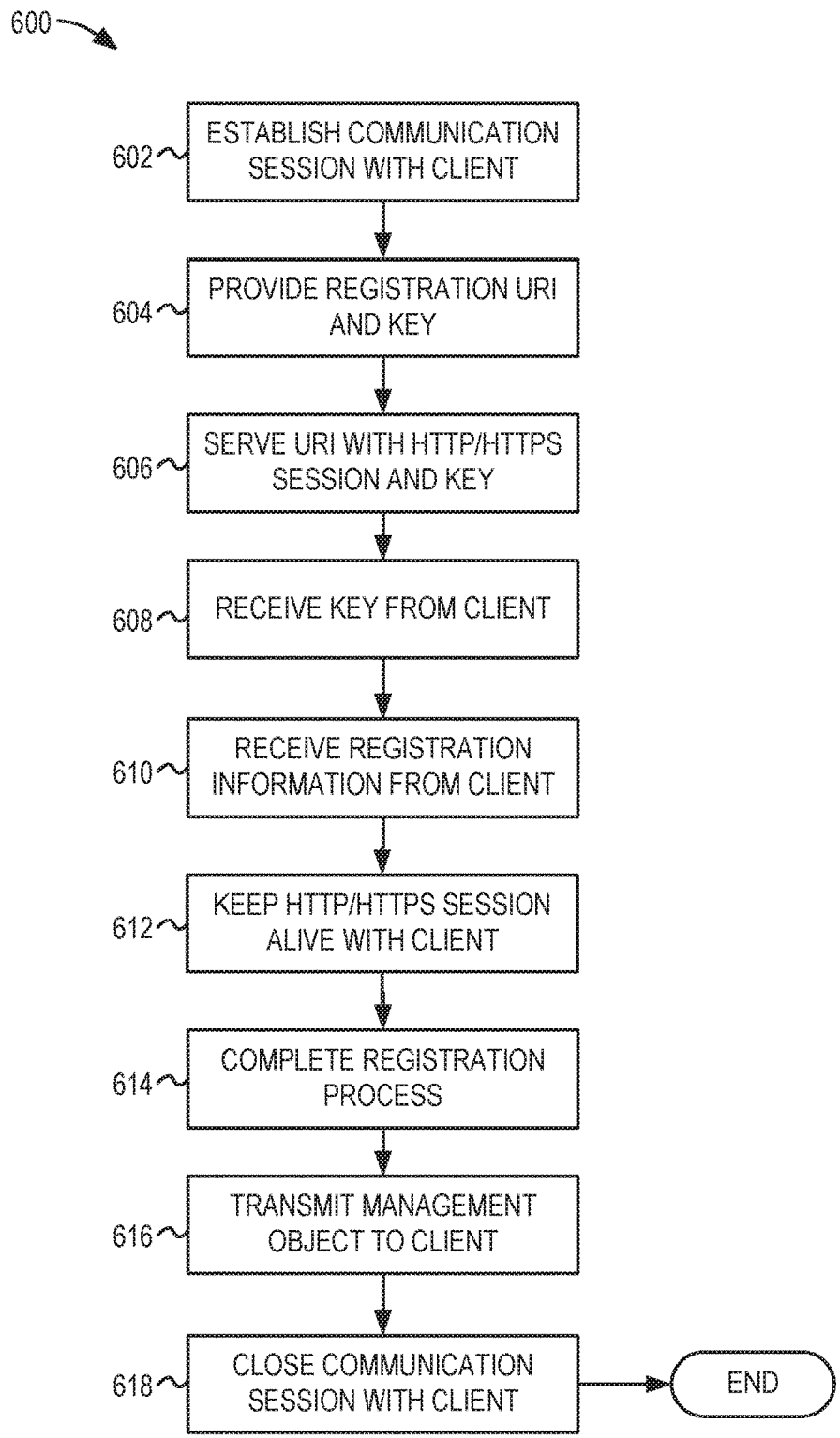
FIG. 6 illustrates a flowchart of an example provisioning flow of operations performed by a wireless network according to a further described example.

FIG. 6 provides an example illustration of an operation flow 600 performed at a wireless network (e.g., an access point) for providing provisioning information to clients for wireless network connectivity. It will be understood that the operation flow 600 provides a general outline of a sequence of operations conducted at an example client, but some of the operations may be conducted in different order, substituted or replaced by other operations, or removed from the flow.

Similar to the provisioning operations depicted in FIG. 5, operations conducted at the access point or server(s) include establishing a communication session with the client (operation 602). Using this connection, a registration URI and key may be provided to the client (operation 604).

A HTTP/HTTPS session may be established to serve the web page(s) associated with the URI and key (operation 606). A key from the client is received by the server and is used to identify the particular user and tie the HTTP session and registration operations to the particular client (operation 608). The web page(s) associated with the URI may be used to receive registration information from the client. This registration information data, submitted through the webpage, is received by the server and then processed as appropriate (operation 610). Mechanisms may be used to keep the HTTP/HTTPS session alive with the client, such as providing a 102 HTTP response (operation 612).

Upon submission and validation of appropriate client data, the registration process can be completed at the server-side (operation 614), and the HTTP/HTTPS session may be closed out. In response to completion of the registration process, the management object may be transmitted to the client (operation 616). The transmission of the management object occurs in the communication session, but not the HTTP/HTTPS session with the browser used to access the URI. Upon communication of the management object, the communication session with the client may be closed (operation 618).

Although the preceding examples of wireless network connections were provided with specific reference to Wi-Fi (IEEE 802.11) and Wi-Fi Alliance communication standards, it will be understood that a variety of other WWAN, WLAN, and WPAN protocols and standards may be used in connection with the techniques described herein. These standards include, but are not limited to, standards from 3GPP (e.g., LTE, LTE-A, HSPA+, UMTS), IEEE 802.16 (e.g., 802.16p), or Bluetooth (e.g., Bluetooth 4.0, or like standards defined by the Bluetooth Special Interest Group) standards families. Other applicable network configurations may be included within the scope of the presently described communication networks. It will be understood that communications on such communication networks may be facilitated using any number of personal area networks, LANs, and WANs, using any combination of wired or wireless transmission mediums.

The embodiments described above may be implemented in one or a combination of hardware, firmware, and software. Various methods or techniques, or certain aspects or portions thereof, may take the form of program code (i.e., instructions) embodied in tangible media, such as flash memory, hard drives, portable storage devices, read-only memory (ROM), random-access memory (RAM), semiconductor memory devices (e.g., Electrically Programmable Read-Only Memory (EPROM), Electrically Erasable Programmable Read-Only Memory (EEPROM)), magnetic disk storage media, optical storage media, and any other machine-readable storage medium or storage device wherein, when the program code is loaded into and executed by a machine, such as a computer or networking device, the machine becomes an apparatus for practicing the various techniques.

A machine-readable storage medium or other storage device may include any non-transitory mechanism for storing information in a form readable by a machine (e.g., a computer). In the case of program code executing on programmable computers, the computing device may include a processor, a storage medium readable by the processor (including volatile and non-volatile memory and/or storage elements), at least one input device, and at least one output device. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

Figure 7:
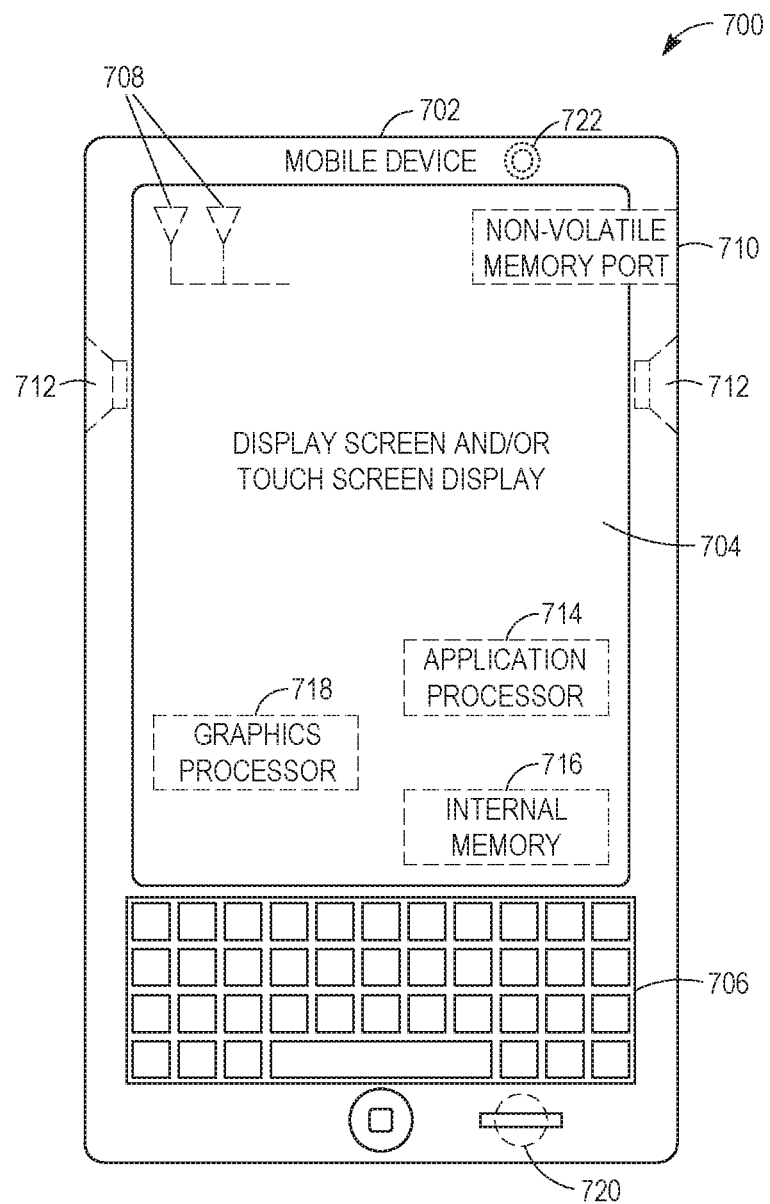
FIG. 7 illustrates an example mobile client device on which the configurations and techniques described herein may be deployed.

FIG. 7 provides an example illustration of a mobile device 700, such as a user equipment (UE), a mobile station (MS), a mobile wireless device, a mobile communication device, a tablet, a handset, or other type of mobile wireless computing device. The mobile device 700 may include one or more antennas 708 within housing 702 that are configured to communicate with a hotspot, base station (BS), an evolved NodeB (eNodeB), or other type of WLAN or WWAN access point. The mobile device may be configured to communicate using multiple wireless communication standards, including standards selected from 3GPP LTE, WiMAX, High Speed Packet Access (HSPA), Bluetooth, and Wi-Fi standard definitions. The mobile device 700 may communicate using separate antennas for each wireless communication standard or shared antennas for multiple wireless communication standards. The mobile device 700 may communicate in a WLAN, a WPAN, and/or a WWAN.

FIG. 7 also provides an illustration of a microphone 720 and one or more speakers 712 that may be used for audio input and output from the mobile device 700. A display screen 704 may be a liquid crystal display (LCD) screen, or other type of display screen such as an organic light emitting diode (OLED) display. The display screen 704 may be configured as a touch screen. The touch screen may use capacitive, resistive, or another type of touch screen technology. An application processor 714 and a graphics processor 718 may be coupled to internal memory 716 to provide processing and display capabilities. A non-volatile memory port 710 may also be used to provide data input/output options to a user. The non-volatile memory port 710 may also be used to expand the memory capabilities of the mobile device 700. A keyboard 706 may be integrated with the mobile device 700 or wirelessly connected to the mobile device 700 to provide additional user input. A virtual keyboard may also be provided using the touch screen. A camera 722 located on the front (display screen) side or the rear side of the mobile device 700 may also be integrated into the housing 702 of the mobile device 700.

Figure 8:
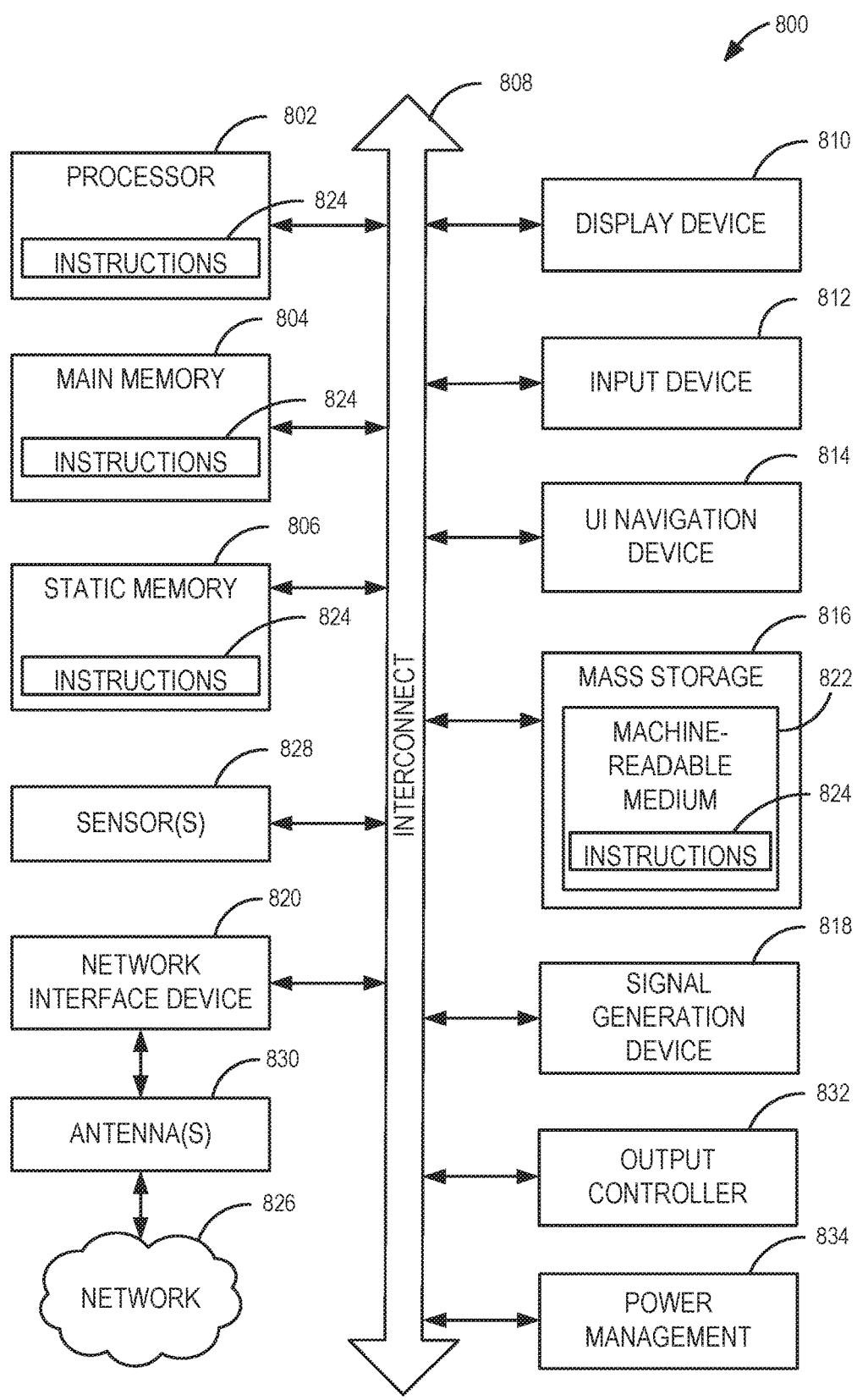
FIG. 8 illustrates an example computer system that may be used as a computing platform for the computing or networking devices described herein.

FIG. 8 is a block diagram illustrating an example computer system machine upon which any one or more of the methodologies herein discussed may be run. Computer system machine 800 may be embodied as the mobile device 106A, computing system 106B, access point 104, servers 112, 114, 122, 124, 126, 128, mobile device 302, access point 306, server 308, mobile device 700, or any other computing platform described or referred to herein. In alternative embodiments, the machine operates as a stand-alone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a personal computer (PC) that may or may not be portable (e.g., a notebook or a netbook), a tablet, a set-top box (STB), a gaming console, a Personal Digital Assistant (PDA), a mobile telephone or smartphone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system machine 800 includes a processor 802 (e.g., a central processing unit (CPU), a graphics processing unit (GPU) or both), a main memory 804 and a static memory 806, which communicate with each other via an interconnect 808 (e.g., a link, a bus, etc.). The computer system machine 800 may further include a video display unit 810, an alphanumeric input device 812 (e.g., a keyboard), and a user interface (UI) navigation device 814 (e.g., a mouse). In one embodiment, the video display unit 810, input device 812 and UI navigation device 814 are a touch screen display. The computer system machine 800 may additionally include a storage device 816 (e.g., a drive unit), a signal generation device 818 (e.g., a speaker), an output controller 832, a power management controller 834, and a network interface device 820 (which may include or operably communicate with one or more antennas 830, transceivers, or other wireless communications hardware), and one or more sensors 828, such as a Global Positioning Sensor (GPS) sensor, compass, location sensor, accelerometer, or other sensor.

The storage device 816 includes a machine-readable medium 822 on which is stored one or more sets of data structures and instructions 824 (e.g., software) embodying or utilized by any one or more of the methodologies or functions described herein. The instructions 824 may also reside, completely or at least partially, within the main memory 804, static memory 806, and/or within the processor 802 during execution thereof by the computer system machine 800, with the main memory 804, static memory 806, and the processor 802 also constituting machine-readable media.

While the machine-readable medium 822 is illustrated in an example embodiment to be a single medium, the term "machine-readable medium" may include a single medium or multiple media (e.g., a centralized or distributed database, and/or associated caches and servers) that store the one or more instructions 824. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions.

The instructions 824 may further be transmitted or received over a communications network 826 using a transmission medium via the network interface device 820 utilizing any one of a number of well-known transfer protocols (e.g., HTTP). The term "transmission medium" shall be taken to include any intangible medium that is capable of storing, encoding, or carrying instructions for execution by the machine, and includes digital or analog communications signals or other intangible medium to facilitate communication of such software.

It should be understood that the functional units or capabilities described in this specification may have been referred to or labeled as components or modules, in order to more particularly emphasize their implementation independence. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices. Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

Example 1 includes the subject matter embodied by a method performed by a device (e.g., a user equipment (UE)) for obtaining provisioning information for wireless network connectivity, comprising: establishing a communication session with a server; receiving, from the server, a key and a universal resource indicator (URI) of a registration webpage hosted by a registration web server; accessing the registration webpage at the URI, using an HTTP session within the communication session, to provide the key and registration information; and receiving, from the server outside of the HTTP session, a Subscription Management Object (MO) in response to submission of the registration information in the HTTP session, wherein the Subscription MO includes the provisioning information.

In Example 2, the subject matter of Example 1 can optionally include associating with a wireless network indicated in the provisioning information.

In Example 3, the subject matter of one or any combination of Examples 1-2 can optionally include the communication session being a Transport Layer Security (TLS) session established via an access point.

In Example 4, the subject matter of one or any combination of Examples 1-3 can optionally include Open Mobile Alliance Device Management (OMA-DM) or Simple Object Access Protocol-Extensible Markup Language (SOAP-XML) communications occurring within the communication session.

In Example 5, the subject matter of one or any combination of Examples 1-4 can optionally include transmitting at least one HTTPS request in the HTTP session to provide the registration information using the registration webpage; and receiving, in response to the HTTPS request, interim responses having a processing status code to prevent a HTTP session timeout until processing of the registration information is completed; wherein the key is used to link the HTTP session established to the registration web server with the communication session established to the server; and wherein upon completion of the HTTP session, using the key generated, the registration web server provides a signal to the server to indicate completion of processing of the registration information, causing the server to transmit the Subscription MO to the UE if processing of the registration information is successfully completed.

In Example 6, the subject matter of one or any combination of Examples 1-5 can optionally include the server being an online sign-up server configured for operation in a service provider data network, and wherein the communication session with the server is performed in connection with communications via an access point of a wireless network.

In Example 7, the subject matter of one or any combination of Examples 1-6 can optionally include the communications via the access point occurring in connection with a standard defined by a Wi-Fi Alliance Hotspot Specification, and wherein the access point operates in accordance with a standard from an IEEE 802.11 standards family.

In Example 8, the subject matter of one or any combination of Examples 1-7 can optionally include the Subscription MO being to obtain provisioning of one or more of: username/password credentials and policies, provisioning of certificate-based credentials, or subscription management for remediation of credentials.

Example 9 can include, or can optionally be combined with all or portions of the subject matter of one or any combination of Examples 1-8 to include the subject matter embodied by a wireless communication device such as a user equipment (UE), comprising: a transceiver comprising circuitry arranged to perform wireless communications with an initial access point and obtain provisioning information for wireless network connectivity to other access points, by performing operations to: transmit, to a service provider via a communication session with the initial access point, a request for the provisioning information; receive, from the service provider, a universal resource indicator (URI) and a key; transmit, using at least one HTTPS request in an HTTP session, a request to access the URI and to provide the key and registration information for wireless network connectivity; and receive, from the service provider, a Subscription Management Object (MO) in response to exchange of the registration information, the Subscription MO including the provisioning information.

In Example 10, the subject matter of Example 9 can optionally include the transceiver further comprising circuitry arranged to establish a wireless network connection with a second access point using the provisioning information, the second access point being indicated in the provisioning information of the Subscription MO.

In Example 11, the subject matter of one or any combination of Examples 9-10 can optionally include the transceiver further comprising circuitry arranged to perform operations to: receive, from the service provider via the communication session, a command to launch a browser to the URI; and receive, from the service provider, at least one HTTPS response used to keep the HTTP session alive for the at least one HTTPS requests during processing of the registration information by the service provider.

In Example 12, the subject matter of one or any combination of Examples 9-11 can optionally include the communication session being an encrypted session facilitating an exchange of Open Mobile Alliance Device Management (OMA-DM) or Simple Object Access Protocol-Extensible Markup Language (SOAP-XML) communications, and wherein the provisioning information is received from the server in the OMA-DM or SOAP-XML communications.

In Example 13, the subject matter of one or any combination of Examples 9-12 can optionally include the transceiver further comprising circuitry to perform operations to: communicate with a service provider data network to obtain provisioning of username/password-based or certificate-based credentials.

In Example 14, the subject matter of one or any combination of Examples 9-12 can optionally include the wireless communications with the initial access point being performed according to a standard from an IEEE 802.11 standards family, and wherein the operations to obtain the provisioning information are performed according to a standard defined by a Wi-Fi Alliance Hotspot Specification.

Example 15 can include, or can optionally be combined with all or portions of the subject matter of one or any combination of Examples 1-14 to include the subject matter embodied by a method performed by a machine (e.g., a server or other computing system) for providing wireless network provisioning information for a wireless network client, comprising: receiving a request for the provisioning information for the wireless network client; transmitting a universal resource indicator (URI) and a key to the wireless network client in response to the request for provisioning information; receiving a HTTPS request to the server at the URI, the HTTPS request including the key to obtain registration information from the wireless network client; transmitting a HTTPS response to the wireless network client, the HTTPS response indicating successful processing of the registration information; and transmitting a Subscription Management Object (MO) to the wireless network client, the Subscription MO including provisioning information for to enable wireless network connectivity of the wireless network client to one or more preferred networks.

In Example 16, the subject matter of Example 15 can optionally include transmitting a command to initiate a browser of the wireless network client to access the URI; wherein the browser of the wireless network client is used to transmit the HTTPS request and receive the HTTPS response, and wherein the Subscription MO is provided to the wireless network client independent of the browser of the wireless network client.

In Example 17, the subject matter of one or any combination of Examples 15-16 can optionally include communications with the wireless network client occurring in a communication session encrypted according to a Transport Layer Security (TLS) standard, and wherein data exchanged in the communications occurs at least in part based on an Open Mobile Alliance Device Management (OMA-DM) or Simple Object Access Protocol-Extensible Markup Language (SOAP-XML) exchange of data.

In Example 18, the subject matter of one or any combination of Examples 15-17 can optionally include the key being associated with the wireless network client prior to transmitting the universal resource indicator to the wireless network client, wherein the HTTPS request provides the key to track the registration information with the wireless network client, and wherein the Subscription Management Object (MO) is transmitted to the wireless network client associated with the key in response to completion of the registration information.

In Example 19, the subject matter of one or any combination of Examples 15-18 can optionally include the provisioning information being included in the Subscription MO includes certificate-based credentials.

Example 20 can include, or can optionally be combined with all or portions of the subject matter of one or any combination of Examples 1-19 to include the subject matter embodied by a machine readable storage medium comprising a plurality of instructions that, in response to being executed on a computing device, cause the computing device to provide provisioning information to a wireless network client, by: providing a universal resource indicator (URI) and a key to the wireless network client, processing registration information from the wireless network client received in an HTTP session, the registration information associated with the key; and transmitting a Subscription Management Object (MO) to the wireless network client upon completion of the registration information, the Subscription MO including the provisioning information; wherein communications with the wireless network client occur in an encrypted communication session.

In Example 21, the subject matter of Example 20 can optionally include the Subscription MO being transmitted to the wireless network client in the encrypted communication session outside of the HTTP session established for exchange of the registration information.

Example 22 can include, or can optionally be combined with all or portions of the subject matter of one or any combination of Examples 1-21 to include the subject matter embodied by a system (e.g., computing servers, devices, and like subsystems in a network), the system comprising: an online sign-up server configured to provide provisioning information to a wireless network client, the wireless network client connected to an access point in network communication with the online sign-up server, and the online sign-up server configured to perform operations to: provide a universal resource indicator (URI) and a key to the wireless network client; process registration information from the wireless network client received in an HTTP session, the registration information associated with the key; and transmit a Subscription Management Object (MO) to the wireless network client upon completion of the registration information, the Subscription MO including the provisioning information.

In Example 23, the subject matter of Example 22 can optionally include a policy server configured to provision network discovery and selection policies to respective subscribers including the wireless network client; a subscription remediation server configured to remediate issues with one or more of: credentials, provisioned data, or a subscription, of the respective subscribers; an authentication, authorization and accounting (AAA) server configured to authenticate the respective subscribers using credentials obtained from the online sign-up server; and a certificate authority providing a certificate to the wireless network client through the AAA server.

In Example 24, the subject matter of one or any combination of Examples 22-23 can optionally include communications between the wireless network client and the sign-up server occurring in an encrypted communication session, with the Subscription MO being provided to the wireless network client in the encrypted communication session outside of the HTTP session established for exchange of the registration information.

In Example 25, the subject matter of one or any combination of Examples 22-24 can optionally include the Subscription MO being provided to the wireless network client in the encrypted communication session using an Open Mobile Alliance Device Management (OMA-DM) or Simple Object Access Protocol-Extensible Markup Language (SOAP-XML) exchange of data, according to a standard defined by a Wi-Fi Alliance Hotspot Specification.

The Abstract is provided to allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A non-transitory machine-readable medium that stores instructions for execution by one or more processors to configure a device to:
   associate with a Wi-Fi network through a Wi-Fi Hotspot;
   initiate a Transport Layer Security (TLS) session with an online signup (OSU) server;
   encode a device management (DM) package 1 for transmission to the OSU server, the DM package 1 including an indication that the apparatus is contacting the OSU server to establish a new subscription; and
   decode a DM package 2 received from the OSU server in response to the DM package 1, the DM package 2 including a universal resource indicator (URI), the URI including a key, the key to link an HTTPS session with the TLS session, wherein the HTTPS session is used to establish a secure HTTPS connection to the URI in a browser of the device.

2. The non-transitory machine-readable medium of claim 1, wherein the instructions further configure the device to:
   launch the browser on a touchscreen display to establish a connection to the URI; and
   exchange registration data with the OSU server to establish the new subscription.

3. The non-transitory machine-readable medium of claim 2, wherein the instructions further configure the device to:
   discard the key subsequent to establishing the new subscription.

4. The non-transitory machine-readable medium of claim 2, wherein exchange of DM packages is an Open Mobile Alliance (OMA) exchange.

5. The non-transitory machine-readable medium of claim 2, wherein the instructions further configure the device to:
   disassociate with a hotspot subsequent to establishing the new subscription; and
   re-associate with the hotspot to establish a Wi-Fi connection using the new subscription.

6. The non-transitory machine-readable medium of claim 2, wherein the instructions further configure the device to encode a DM package include a request that the device be notified upon completion of user input in the browser.

7. An apparatus of a station (STA), the apparatus comprising:
   memory; and
   processing circuitry coupled to the memory, the processing circuitry configured to:
   initiate a Transport Layer Security (TLS) session with an online signup (OSU) server;
   encode a device management (DM) package 1 for transmission to the OSU server, the DM package 1 including an indication that the apparatus is contacting the OSU server to establish a new subscription; and
   decode a DM package 2 received from the OSU server in response to the DM package 1, the DM package 2 including a universal resource indicator (URI), the URI including a key, the key to link an HTTPS session with the TLS session, wherein the HTTPS session is used to establish a secure HTTPS connection to the URI in a browser of the STA.

8. The apparatus of claim 7, wherein the processing circuitry is configured to:

launch the browser to establish a connection to the URI; and exchange registration data with the OSU server to establish the net subscription.

9. The apparatus of claim 8, wherein the processing circuitry is configured to:
discard the key.

10. The apparatus of claim 7, wherein exchange of DM packages is an Open Mobile Alliance (OMA) exchange.

11. The apparatus of claim 8, wherein the processing circuitry is to:
disassociate with a hotspot subsequent to establishing the new subscription; and
re-associate with the hotspot to establish a Wi-Fi connection using the new subscription.

12. The apparatus of claim 7, further comprising:
transceiver circuitry; and
one or more antennas to be coupled to the transceiver.

13. The apparatus of claim 7, further comprising:
a touchscreen display to display an icon associated with the OSU server.

14. A method performed by a mobile device for secure on-line sign-up and provisioning for Wi-Fi Hotspot 2.0 networks, the method comprising:
associating with a Wi-Fi network through a Wi-Fi Hotspot;
initiating a Transport Layer Security (TLS) session with an online signup (OSU) server;
encoding a device management (DM) package 1 for transmission to the OSU server, the DM package 1 including an indication that the apparatus is contacting the OSU server to establish a new subscription; and
decoding a DM package 2 received from the OSU server in response to the DM package 1, the DM package 2 including a universal resource indicator (URI), the URI including a key, the key to link an HTTPS session with the TLS session, wherein the HTTPS session is used to establish a secure HTTPS connection to the URI in a browser of the mobile device.

15. The method of claim 14, further comprising:
launching the browser on a touchscreen display to establish connection to the URI; and
exchanging registration data with the OSU server to establish the new subscription.

16. The method of claim 15, wherein the instructions further configure the mobile device to:
discard the key.

17. The method of claim 14, further comprising:
receiving a subscription management object from the OSU server for use in managing the new subscription.

18. The method of claim 15, further comprising:
disassociating with a hotspot subsequent to establishing the new subscription; and
re-associating with the hotspot to establish a Wi-Fi connection using the new subscription.

19. A mobile device comprising:
a transceiver and an application processor configured to:
associate with a Wi-Fi network through a Wi-Fi Hotspot;
initiate a Transport Layer Security (TLS) session with an online signup (OSU) server;
encode a device management (DM) package 1 for transmission to the OSU server, the DM package 1 including an indication that the apparatus is contacting the OSU server to establish a new subscription; and
decode a DM package 2 received from the OSU server in response to the DM package 1, the DM package 2 including a universal resource indicator (URI), the URI including a key, the key to link an HTTPS session with the TLS session, wherein the HTTPS session is used to establish a secure HTTPS connection to the URI in a browser of the mobile device;
a touchscreen display to display the browser to receive user input to establish a connection to the URI to exchange registration data with the OSU server to establish the new subscription; and
one or more antennas coupled to the transceiver.

20. The mobile device of claim 19, wherein the transceiver is configured to communicate using Bluetooth.

21. The mobile device of claim 19, wherein the transceiver is configured to communicate using a standard of the 3rd Generation Partnership Project (3GPP) Long Term Evolution (LTE) family of standards.

* * * * *

UNITED STATES PATENT AND TRADEMARK OFFICE
CERTIFICATE OF CORRECTION

PATENT NO. : 10,313,449 B2
APPLICATION NO. : 15/198090
DATED : June 4, 2019
INVENTOR(S) : Canpolat et al.

Page 1 of 1

It is certified that error appears in the above-identified patent and that said Letters Patent is hereby corrected as shown below:

In the Claims

In Column 17, Line 4, in Claim 8, delete "net" and insert --new-- therefor

In Column 17, Line 42, in Claim 15, before "connection", insert --a--

Signed and Sealed this
Twenty-first Day of April, 2020

Andrei Iancu
*Director of the United States Patent and Trademark Office*